United States Patent
Takahashi et al.

(10) Patent No.: US 8,279,938 B2
(45) Date of Patent: Oct. 2, 2012

(54) ENCODING DEVICE AND METHOD, DECODING DEVICE AND METHOD, PROGRAM, RECORDING MEDIUM, AND DATA STRUCTURE

(75) Inventors: Kuniaki Takahashi, Tokyo (JP); Toshiya Hamada, Saitama (JP); Yasushi Fujinami, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1072 days.

(21) Appl. No.: 11/720,806

(22) PCT Filed: Nov. 30, 2005

(86) PCT No.: PCT/JP2005/022409
§ 371 (c)(1),
(2), (4) Date: Jan. 23, 2008

(87) PCT Pub. No.: WO2006/059779
PCT Pub. Date: Jun. 8, 2006

(65) Prior Publication Data
US 2010/0128799 A1    May 27, 2010

(30) Foreign Application Priority Data
Dec. 2, 2004    (JP) ................................. 2004-349816

(51) Int. Cl.
*H04N 7/12* (2006.01)
(52) U.S. Cl. ......... 375/240.25; 375/240.17; 375/240.26; 348/445; 348/565; 348/584
(58) Field of Classification Search ............ 375/240.17, 375/240.25, 240.26; 348/445, 565, 584
See application file for complete search history.

(56) References Cited

U.S. PATENT DOCUMENTS

| | | | | |
|---|---|---|---|---|
| 5,369,444 A * | 11/1994 | Ersoz et al. | ................... | 348/598 |
| 5,420,641 A * | 5/1995 | Tsuchida | ....................... | 348/556 |
| 5,467,142 A * | 11/1995 | Ichinokawa | .................. | 348/556 |
| 5,532,752 A * | 7/1996 | Miyano | ........................ | 348/468 |
| 5,680,177 A * | 10/1997 | Abe | .............................. | 348/564 |
| 5,912,710 A * | 6/1999 | Fujimoto | ...................... | 348/445 |
| 5,930,450 A * | 7/1999 | Fujita | ............................ | 386/241 |
| 5,963,704 A * | 10/1999 | Mimura et al. | ............... | 386/243 |
| 6,246,401 B1 * | 6/2001 | Setogawa et al. | ............. | 715/723 |

(Continued)

FOREIGN PATENT DOCUMENTS
JP    5 64100    3/1993
(Continued)

OTHER PUBLICATIONS

U.S. Appl. No. 11/570,141, filed Dec. 7, 2006, Takahashi, et al.
(Continued)

*Primary Examiner* — Phirin Sam
*Assistant Examiner* — Andrew C Lee
(74) *Attorney, Agent, or Firm* — Oblon, Spivak, McClelland, Maier & Neustadt, L.L.P.

(57) ABSTRACT

It is possible to display a caption with an aspect ratio independent from the aspect ratio of a main video. When a flag indicating that the aspect ratio of the caption is 16:9 is set, the caption video image frame size (720×480) is converted so as to match the aspect ratio of 16:9 and the caption video obtained as the result is superimposed on the main video and displayed. That is, when the main video has an aspect ratio of 4:3, as shown in FIG. 19, reduction in the lateral direction is performed and the main video is displayed with addition of black tone at the right and left but the caption video is displayed with the aspect ratio of 16:9.

4 Claims, 25 Drawing Sheets

U.S. PATENT DOCUMENTS

| | | | |
|---|---|---|---|
| 6,678,006 B1 * | 1/2004 | Velez et al. | 348/564 |
| 7,042,511 B2 * | 5/2006 | Lin | 348/445 |
| 7,099,570 B2 * | 8/2006 | Itani | 386/233 |
| 7,180,549 B2 * | 2/2007 | Lin | 348/445 |
| 7,292,284 B2 * | 11/2007 | Kim | 348/564 |
| 7,391,473 B2 * | 6/2008 | Takahashi | 348/561 |
| 7,480,011 B2 * | 1/2009 | Kuo et al. | 348/558 |
| 7,605,865 B2 * | 10/2009 | Lin | 348/445 |
| 2002/0041754 A1 * | 4/2002 | Kikuchi et al. | 386/46 |
| 2002/0106196 A1 * | 8/2002 | Yamauchi et al. | 386/95 |
| 2002/0159766 A1 * | 10/2002 | Hisatomi et al. | 386/131 |
| 2004/0164946 A1 * | 8/2004 | Cavanaugh et al. | 345/101 |
| 2004/0223745 A1 * | 11/2004 | Sawabe et al. | 386/96 |

FOREIGN PATENT DOCUMENTS

| | | |
|---|---|---|
| JP | 5 336465 | 12/1993 |
| JP | 10 308924 | 11/1998 |
| JP | 2000-184375 | 6/2000 |
| JP | 2004 215045 | 7/2004 |
| JP | 2004 215046 | 7/2004 |

OTHER PUBLICATIONS

U.S. Appl. No. 11/720,679, filed Jun. 1, 2007, Takahashi, et al.

* cited by examiner

Fig. 11

MAIN PICTURE (4 : 3)

SUBTITLE (4 : 3)

Fig. 20

MAIN PICTURE (16 : 9)

SUBTITLE (16 : 9)

Fig. 25

MAIN PICTURE (16 : 9)

SUBTITLE (4 : 3)

ENCODING DEVICE AND METHOD, DECODING DEVICE AND METHOD, PROGRAM, RECORDING MEDIUM, AND DATA STRUCTURE

TECHNICAL FIELD

The present invention relates to an encoding apparatus and method, a decoding apparatus and method, a program, a record medium, and a data structure, in particular, to those that allow a sub picture to be displayed with an aspect ratio independent from that of a main picture.

BACKGROUND ART

A picture such as a subtitle (this picture is hereinafter referred to as the sub picture) may be superimposed with a picture of content (this picture is hereinafter referred to as the main picture) and the superimposed pictures are displayed so as to supplement the main picture.

Normally, the aspect ratio of the sub picture is associated with that of the main picture. When the aspect ratio of the main picture with which the sub picture is superimposed is a:b, the aspect ratio of the sub picture is set to a:b. When the aspect ratio of the main picture with which the sub picture is superimposed is c:d, the aspect ratio of the sub picture is set to c:d.

As a specific example, when the aspect ratio of the display device is 16:9 and that of the main picture is 4:3, as shown in FIG. 1, the picture frame size of the main picture is changed and data that cause the left and right end areas of the screen to become black are added. At this point, the subtitle is normally displayed with an aspect ratio of 4:3 (see Patent Document, Japanese Patent Application Laid-Open No. HEI 10-308924).

However, in a small electronic device such as a PDA (Personal Digital Assistant) that has a major feature of its portability, since the device is provided with a small display device, when the aspect ratio of the display screen is 16:9 and that of the main picture is 4:3, with the presence of the side panel portions as shown in FIG. 1, if the sub tile is displayed with an aspect ratio of 4:3, it may become difficult to watch the subtitle.

DISCLOSURE OF THE INVENTION

The present invention is made from the foregoing point of view and is to display the sub picture with an aspect ratio independent from that of the main picture.

The present invention is an encoding apparatus including a first encoding section which encodes the main picture and incorporates an aspect ratio of the main picture in the encoded data of the main picture and a second encoding section which encodes the sub picture and incorporates an aspect ratio of the sub picture in the encoded data of the sub picture.

The second encoding section can set a flag which represents the aspect ratio of the sub picture to incorporate the aspect ratio of the sub picture in the encoded data of the sub picture.

The present invention is an encoding method including the steps of encoding the main picture and incorporating an aspect ratio of the main picture in the encoded data of the main picture and encoding the sub picture and incorporating an aspect ratio of the sub picture in the encoded data of the sub picture.

The present invention is a first program including the steps of encoding the main picture and incorporating an aspect ratio of the main picture in the encoded data of the main picture and encoding the sub picture and incorporating an aspect ratio of the sub picture in the encoded data of the sub picture.

In the encoding apparatus and method and the first program of the present invention, the main picture is encoded and the aspect ratio of the main picture is incorporated in the encoded main picture. The sub picture is encoded and the aspect ratio of the sub picture is incorporated in the encoded sub picture.

The present invention is a decoding apparatus including a first obtaining section which obtains an aspect ratio of the main picture from the encoded data of the main picture, a first converting section which converts a picture frame of the main picture based on the aspect ratio of the main picture obtained by the first obtaining section, a second obtaining section which obtains an aspect ratio of the sub picture from the encoded data of the sub picture, and a second converting section which converts a picture frame of the sub picture based on the aspect ratio of the sub picture obtained by the second obtaining section.

The present invention is a decoding method including the steps of obtaining an aspect ratio of the main picture from the encoded data of the main picture, converting a picture frame of the main picture based on the aspect ratio of the main picture obtained at the first obtaining step, obtaining an aspect ratio of the sub picture from the encoded data of the sub picture, and converting a picture frame of the sub picture based on the aspect ratio of the sub picture obtained at the second obtaining step.

The present invention is a second program including the steps of obtaining an aspect ratio of the main picture from the encoded data of the main picture, converting a picture frame of the main picture based on the aspect ratio of the main picture obtained at the first obtaining step, obtaining an aspect ratio of the sub picture from the encoded data of the sub picture, and converting a picture frame of the sub picture based on the aspect ratio of the sub picture obtained at the second obtaining step.

In the decoding apparatus and method and the second program of the present invention, the aspect ratio of the main picture is obtained from the encoded data of the main picture. The picture frame of the main picture is converted based on the obtained aspect ratio of the main picture. The aspect ratio of the sub picture is obtained from the encoded data of the sub picture. The picture frame of the sub picture is converted based on the obtained aspect ratio of the sub picture.

The present invention is a record medium on which encoded data of a main picture of which main picture data have been encoded and encoded data of a sub picture of which sub picture data have been encoded have been multiplexed and recorded, the main picture data and the sub picture data being displayed by superimposing the main picture data with the sub picture data, wherein the encoded data of the main picture has a first aspect ratio flag which represents an aspect ratio of the main picture data, and wherein the encoded data of the sub picture has a second aspect ratio flag which represents an aspect ratio of the sub picture data, the second aspect ratio being independent from the first aspect ratio.

The present invention is a data structure in which encoded data of a main picture of which main picture data have been encoded and encoded data of a sub picture of which sub picture data have been encoded have been multiplexed, the main picture data and the sub picture data being displayed by superimposing the main picture data with the sub picture data, wherein the encoded data of the main picture has a first aspect ratio flag which represents an aspect ratio of the main picture data, and wherein the encoded data of the sub picture has a second aspect ratio flag which represents an aspect ratio of the sub picture data, the second aspect ratio being independent from the first aspect ratio.

In the record medium and the data structure of the present invention, the encoded data of the main picture of which the main picture data have been encoded and the encoded data of the sub picture of which the sub picture data superimposed with the main picture data have been encoded are multiplexed and recorded. The encoded data of the main picture has the first aspect ratio flag that represents the aspect ratio of the main picture data. The encoded data of the sub picture has the second aspect ratio flag that represents the aspect ratio of the sub picture data, the second aspect ratio flag being independent from the first aspect ratio flag. Thus, the aspect ratio of the main picture and that of the sub picture are obtained from the encoded data of the main picture and the encoded data of the sub picture, respectively. The picture frame of the main picture can be converted based on the obtained aspect ratio of the main picture. The picture frame of the sub picture can be converted based on the obtained aspect ratio of the sub picture.

According to the present invention, the sub picture can be displayed with an aspect ratio independent from that of the main picture.

BRIEF DESCRIPTION OF DRAWINGS

FIG. 11 is another schematic diagram showing a display example of a subtitle according to the present invention;

FIG. 20 is another schematic diagram showing a display example of a subtitle according to the present invention;

FIG. 25 is another schematic diagram showing a display example of a subtitle according to the present invention.

BEST MODES FOR CARRYING OUT THE INVENTION

Next, embodiments of the present invention will be described. The relationship between the invention described in this specification and embodiments of the present invention is as follows. The description in this section denotes that embodiments that support the invention set forth in the specification are described in this specification. Thus, even if some embodiments are not described in this section, it is not implied that the embodiments do not correspond to the invention. Conversely, even if embodiments are described as the invention in this section, it is not implied that these embodiments do not correspond to other than the invention.

The description of this section does not imply all aspects of the invention described in this specification. In other words, the description in this section corresponds to invention described in the specification. Thus, the description in this section does not deny that there are aspects of the present invention that are not set forth in the claims of the present patent application and that divisional patent applications may be made and/or additional aspects of the present invention may be added as amendments.

One embodiment is an encoding apparatus which generates encoded data of pictures displayed by superimposing a main picture with a sub picture, including a first encoding section (for example, a main picture encoding section 31 shown in FIG. 3) which encodes the main picture and incorporates an aspect ratio of the main picture in the encoded data of the main picture; and a second encoding section (for example, a sub picture encoding section 32 shown in FIG. 3) which encodes the sub picture and incorporates an aspect ratio of the sub picture in the encoded data of the sub picture.

The second encoding section sets a flag which represents the aspect ratio of the sub picture (for example, a flag which represents 16:9, a flag which represents 4:3, or a flag which represents 16:9 and 4:3) to incorporate the aspect ratio of the sub picture in the encoded data of the sub picture.

Figure 3:
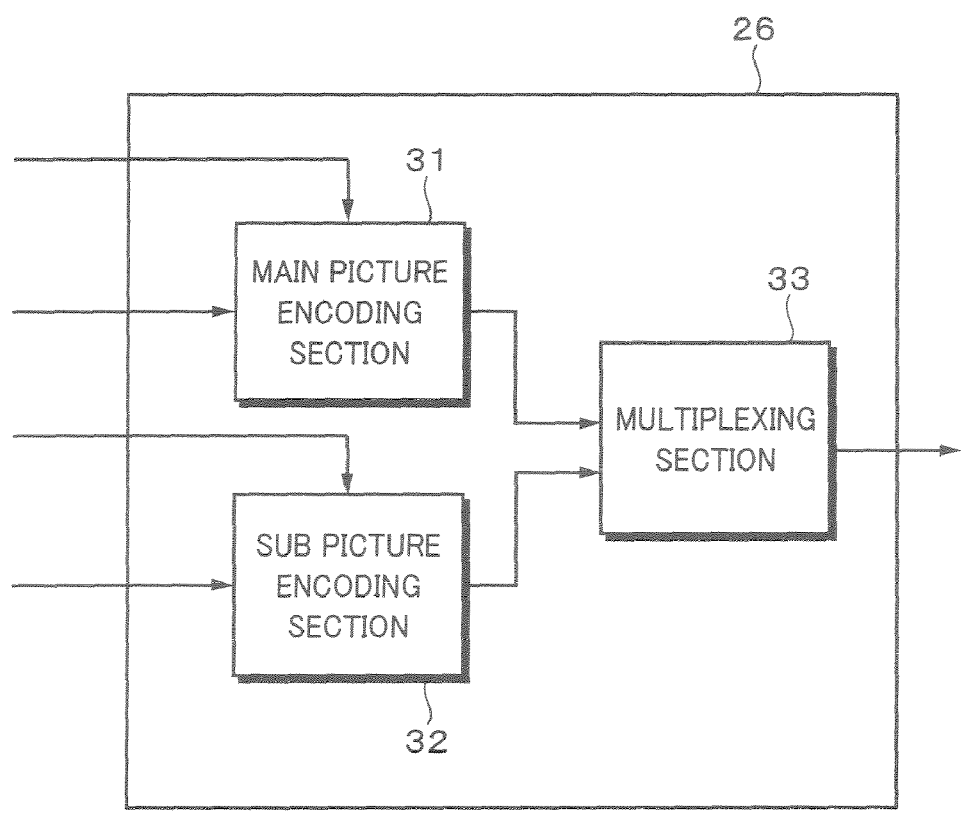
FIG. 3 is a block diagram showing an example of a structure of a video encoder 26 shown in FIG. 2.

Another embodiment is an encoding method and a program of generating encoded data of pictures displayed by superimposing a main picture with a sub picture, including the steps of encoding the main picture and incorporating an aspect ratio of the main picture in the encoded data of the main picture (for example, a process of the main picture encoding section 31 shown in FIG. 3) and encoding the sub picture and incorporating an aspect ratio of the sub picture in the encoded data of the sub picture (for example, a process of the sub picture encoding section 32 shown in FIG. 3).

Figure 7:
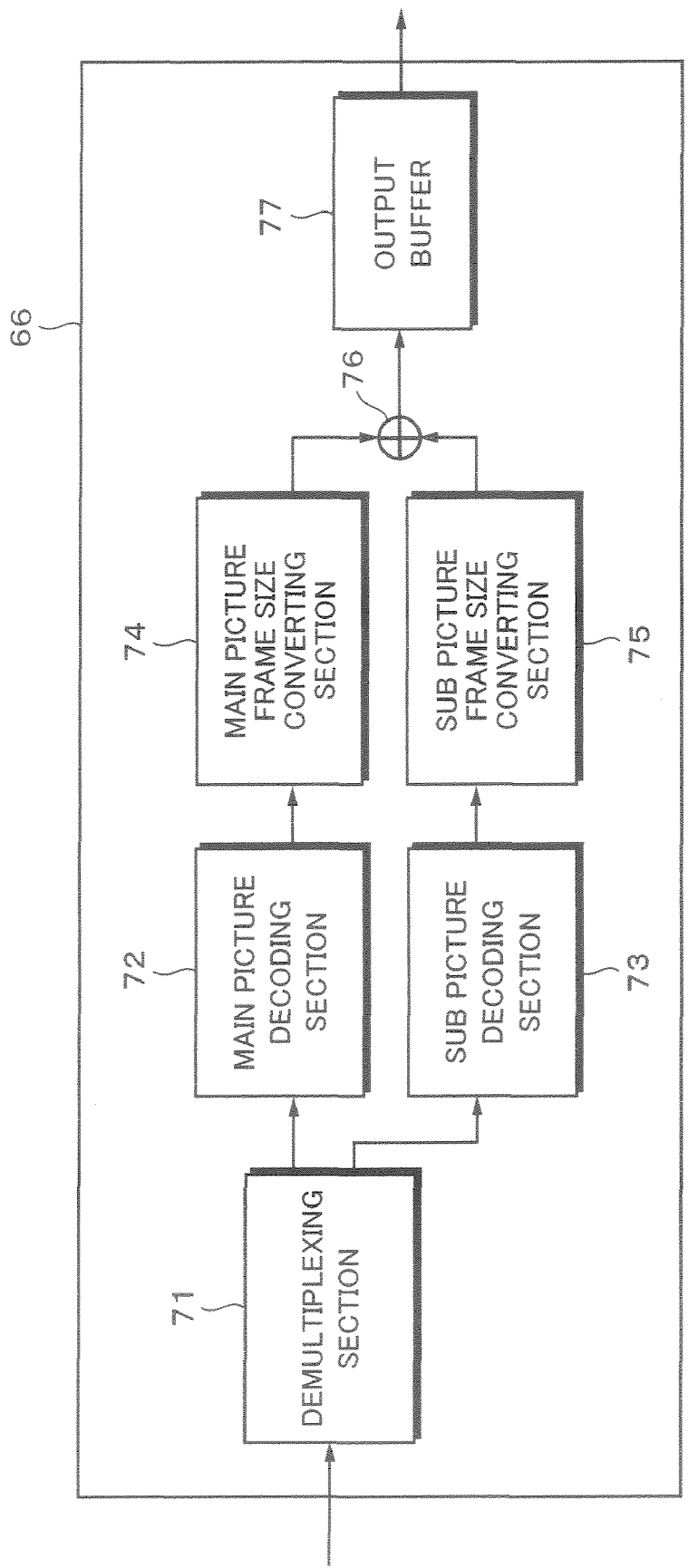
FIG. 7 is a block diagram showing an example of a structure of a video decoder 66 shown in FIG. 6.

Another embodiment is a decoding apparatus which decodes encoded data of a main picture and encoded data of a sub picture displayed by superimposing the main picture with the sub picture, including a first obtaining section (for example, a main picture decoding section 72 shown in FIG. 7) which obtains an aspect ratio of the main picture from the encoded data of the main picture, a first converting section (for example, a main picture frame size converting section 74 shown in FIG. 7) which converts a picture frame of the main picture based on the aspect ratio of the main picture obtained by the first obtaining section, a second obtaining section (for example, a sub picture decoding section 73 shown in FIG. 7) which obtains an aspect ratio of the sub picture from the encoded data of the sub picture, and a second converting section (for example, a sub picture frame size converting section 75 shown in FIG. 7) which converts a picture frame of the sub picture based on the aspect ratio of the sub picture obtained by the second obtaining section.

Another embodiment is a decoding method and a program of decoding encoded data of a main picture and encoded data of a sub picture displayed by superimposing the main picture with the sub picture, including the steps of obtaining an aspect ratio of the main picture from the encoded data of the main picture (for example, a process of the main picture decoding section 72 shown in FIG. 7), converting a picture frame of the main picture based on the aspect ratio of the main picture obtained at the first obtaining step (for example, a process of the main picture frame size converting section 74 shown in FIG. 7), obtaining an aspect ratio of the sub picture from the encoded data of the sub picture (for example, a process of the sub picture decoding section 73 shown in FIG. 7), and converting a picture frame of the sub picture based on the aspect ratio of the sub picture obtained at the second obtaining step (for example, a process of the sub picture frame size converting section 75 shown in FIG. 7).

Figure 1:
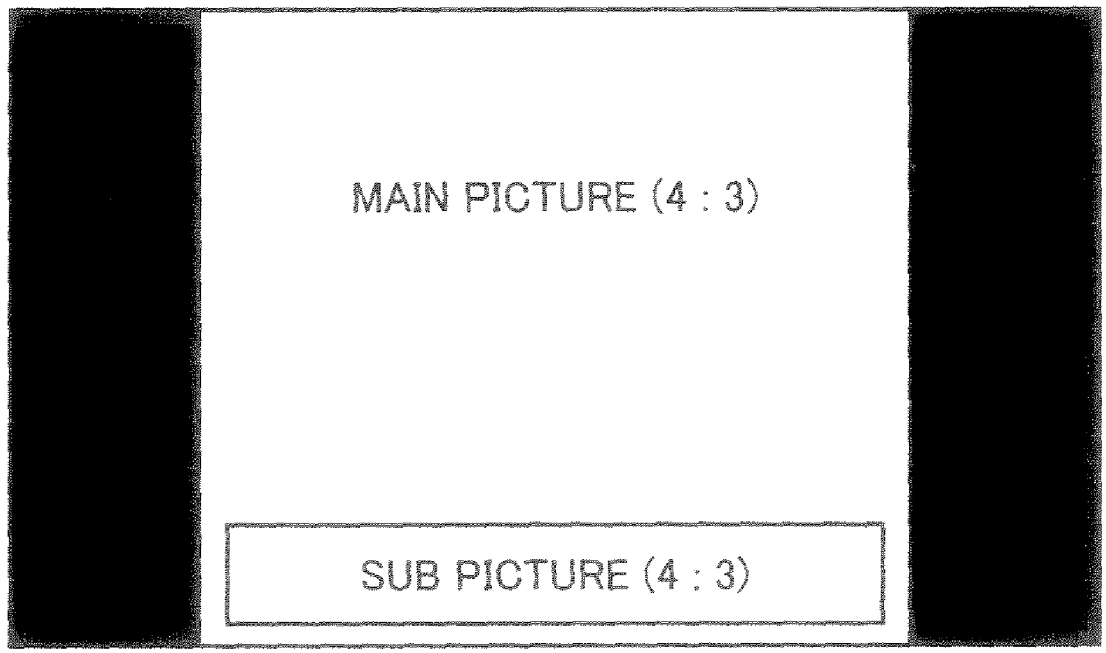
FIG. 1 is a schematic diagram showing a display example of a subtitle according to related art.
Figure 2:
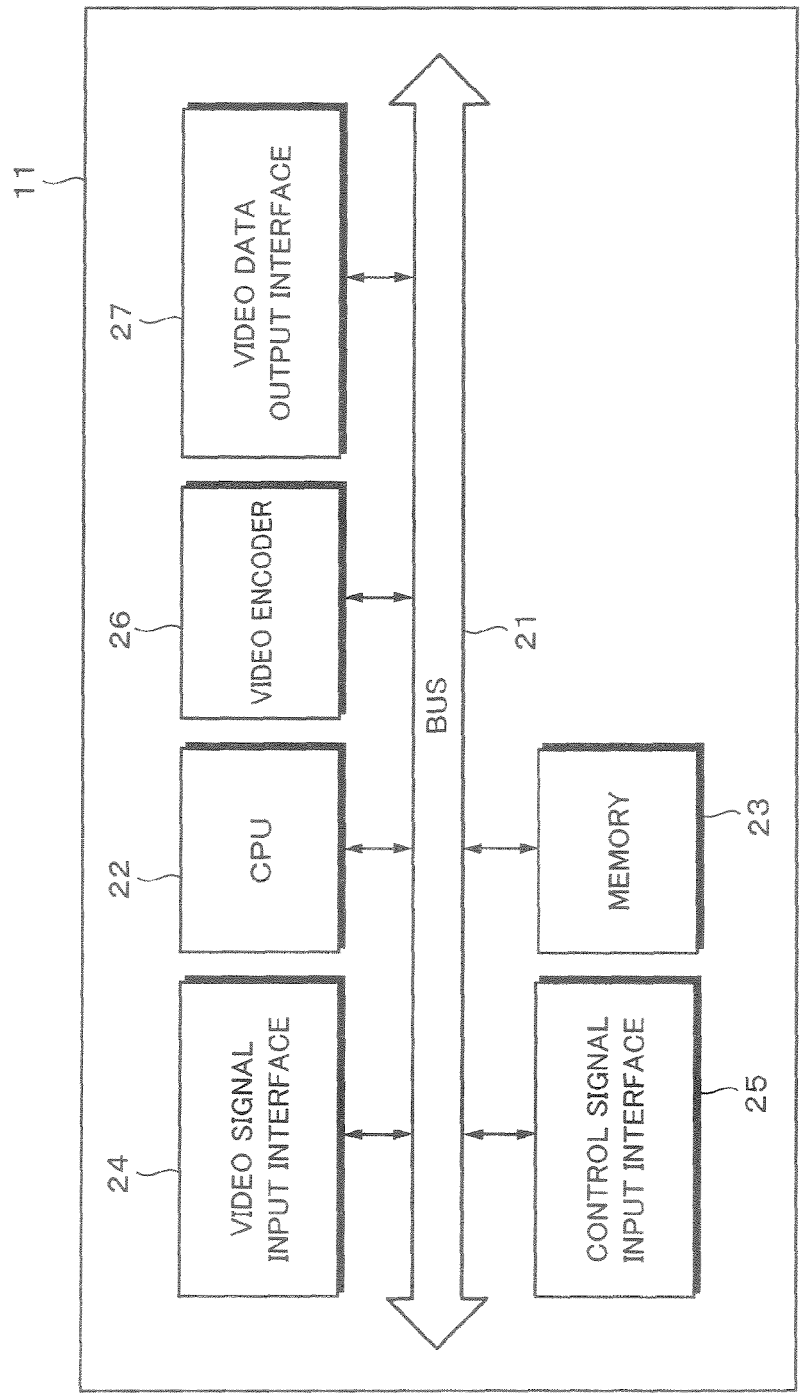
FIG. 2 is a block diagram showing an example of a structure of an encoding apparatus according to the present invention.

FIG. 2 shows an example of a structure of an encoding apparatus 11 according to the present invention.

Connected to a bus 21 are a CPU (Central Processing Unit) 22, a memory 23, a video signal input interface 24, a control signal input interface 25, a video encoder 26, a video data output interface 27, and so forth.

The CPU 22 and the memory 23 compose a computer system. In other words, the CPU 22 executes a program stored in the memory 23, controls the entire apparatus, and performs a process (that will be described later). The memory 23 stores the program that the CPU 22 executes. In addition, the memory 23 temporarily stores data with which the CPU 22 operates. The memory 23 can be structured by only a non-volatile memory or a combination of a volatile memory and a nonvolatile memory. When the apparatus shown in FIG. 2 is provided with a hard disk and it stores the program that the CPU 22 executes, the memory 23 can be structured only by a volatile memory.

The program that the CPU 22 executes can be pre-stored in the memory 23 as an internal record medium of the apparatus.

Instead, the program can be temporarily or permanently stored in a removable record medium such as a disc, a flexible disc, a CD-ROM (Compact Disc Read Only Memory), an MO (Magneto Optical) disc, a magnetic disc, or a memory card. Such a removable record medium can be provided as so-called package software.

The program can be pre-stored in the memory 23 or installed from such a removable record medium to the apparatus. In addition, the program can be wirelessly transferred from a download site to the apparatus through a satellite for a digital satellite broadcast. Instead, the program can be transferred by cable from a download site to the apparatus through a network such as a LAN (Local Area Network) or the Internet. The apparatus can receive the program and install it in the internal memory 23.

The program can be processed by one CPU or distributively processed by a plurality of CPUs.

The video signal input interface 24 inputs a video signal of the main picture and a video signal of the sub picture supplied from a video camera or the like under the control of the CPU 22 and supplies the video signals to the CPU 22, the memory 23, the video encoder 26, and so forth through the bus 21.

When the user operates a key (button) or a remote controller commander (not shown), the control signal input interface 25 inputs a control signal therefrom and supplies it to the CPU 22 through the bus 21. The control signal input interface 25 also functions as a communication interface such as a model (including an ADSL (Asymmetric Digital Subscriber Line) modem), an NIC (Network Interface Card), or the like.

The video encoder 26 encodes video signals that have been input through the video signal input interface 24 and supplies resultant video data to the CPU 22 through the bus 21.

The video data output interface 27 outputs a video transport stream of which the video data have been packetized by the CPU 22.

Figure 4:
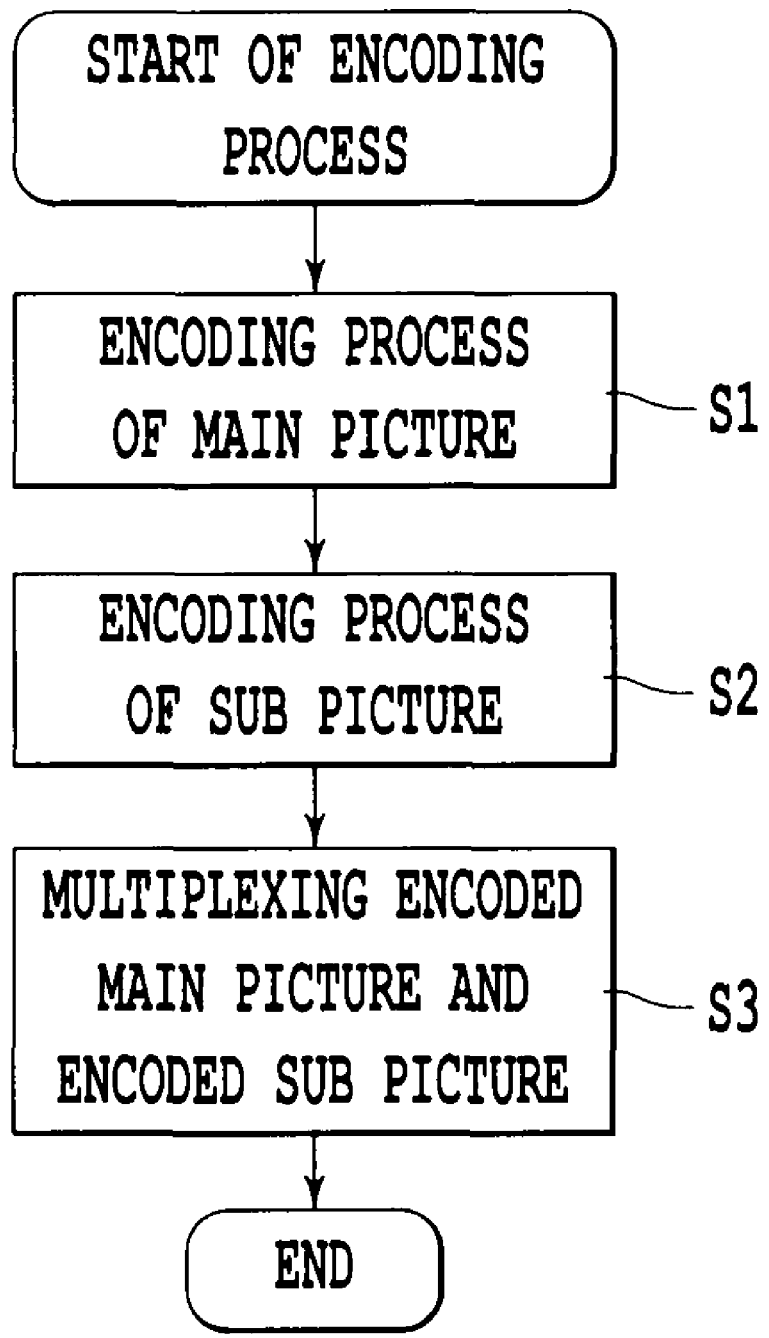
FIG. 4 is a flow chart showing an outline of an example of a process of the video encoder.

FIG. 3 shows an example of a structure of the video encoder 26 shown in FIG. 2. FIG. 4 is a flow chart showing an outline of an example of a process of video encoder 26.

First of all, with reference to the flow chart shown in FIG. 4, an outline of an example of a process of the video encoder 26 will be described. At step S1, a main picture encoding section 31 performs an encoding process for the video signal of the main picture and incorporates the aspect ratio and so forth of the main picture in the encoded data. At step S2, a sub picture encoding section 32 performs an encoding process for the video signal of the sub picture and incorporates the aspect ratio and so forth of the sub picture in the encoded data. At step S3, the encoded data of the main picture in which the aspect ratio and so forth of the main picture have been incorporated and the encoded data of the sub picture in which the aspect ratio and so forth of the sub picture have been incorporated are multiplexed.

The order of step S1 and step S2 is not limited to that shown in FIG. 4. For example, after the process for the sub picture at step S2 has been performed, the process for the main picture at step S1 can be performed. Instead, the process for the main picture at step S1 and the process for the sub picture the step S2 can be performed in parallel.

Next, the process of the video encoder 26 will be described in more detail. The main picture encoding section 31 encodes the video signal of the main picture that has been input through the video signal input interface 24 and incorporates the aspect ratio and so forth of the main picture of which the video encoder 26 has been informed by the CPU 22 in the encoded data and supplies the resultant data to a multiplexing section 33.

Data of the aspect ratio and so forth of the main picture are incorporated in encoded data of which the video signal of the main picture has been encoded. Instead, data of the aspect ratio and so forth of the main picture can be incorporated in the pre-encoded video signal of the main picture and then the video signal of the main picture and the data of the aspect ratio and so forth can be encoded together.

The sub picture encoding section 32 encodes data of the sub picture such as a subtitle or graphics that have been input through the video signal input interface 24, incorporates the size, position information, aspect ratio, and so forth of the sub picture of which the sub picture encoding section 32 has been informed by the CPU 22 in the encoded data and supplies the resultant data to the multiplexing section 33. In the following description, it is assumed that the sub picture is a subtitle.

Data of the aspect ratio and so forth of the sub picture are incorporated in encoded data of which the video signal of the sub picture has been encoded. Instead, data of the aspect ratio and so forth of the sub picture can be incorporated in the pre-encoded video signal of the sub picture and then the video signal of the sub picture and the data of the aspect ratio and so forth can be encoded together.

For the aspect ratio of the sub picture, a flag that represents an aspect ratio of 4:3, a flag that represents an aspect ratio of 16:9, or a flag that represents an aspect ratio of 4:3 or 16:9 is set.

Figure 5:
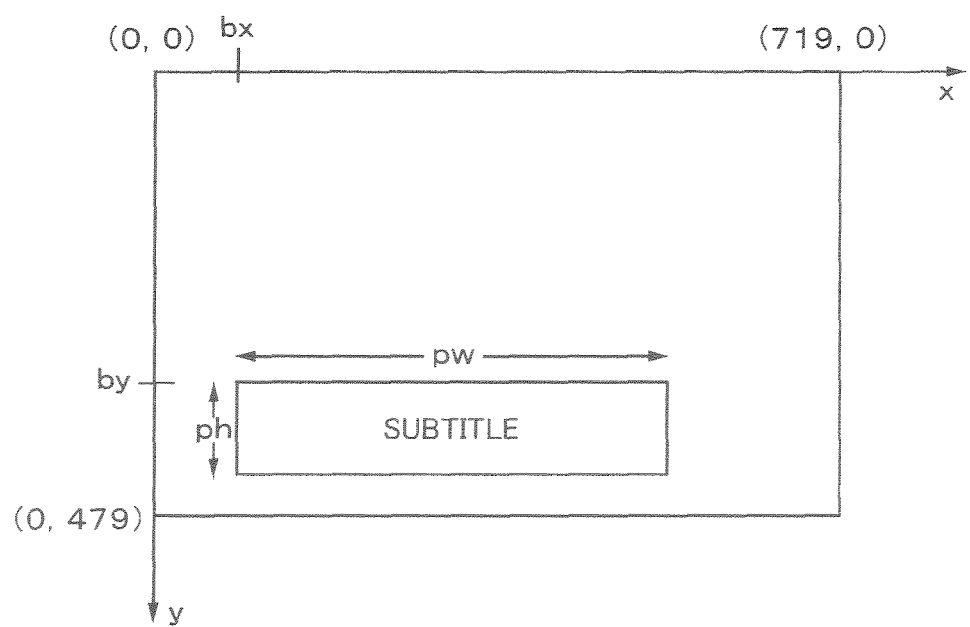
FIG. 5 is a schematic diagram describing coordinates of a subtitle.

When one type of a picture frame of 720×480 is defined for the sub picture as shown in FIG. 5, the size of a subtitle is represented by the height of the subtitle, ph (the size in the Y axis direction), the width of the subtitle, pw (the size in the X axis direction), and the position of the subtitle is represented by the coordinates (bx, by) at the upper left corner of the subtitle such that the relationship of (bx+pw, by+ph)≦(719, 479) is satisfied. In other words, a subtitle is placed within 720×480. As will be described later, the size and position of the subtitle projected on the screen of the display device are converted into proper values. The resultant subtitle is superimposed with the main picture and the resultant superimposed pictures are output.

Returning to FIG. 3, the multiplexing section 33 multiplexes the encoded data of the main picture, in which the aspect ratio and so forth of the main picture have been incorporated and which have been supplied from the main picture encoding section 31, and the encoded data of the sub picture, in which the aspect ratio and so forth of the sub picture have been incorporated and which have been supplied from the sub picture encoding section 32, and supplies the multiplexed data to the video data output interface 27.

Figure 6:
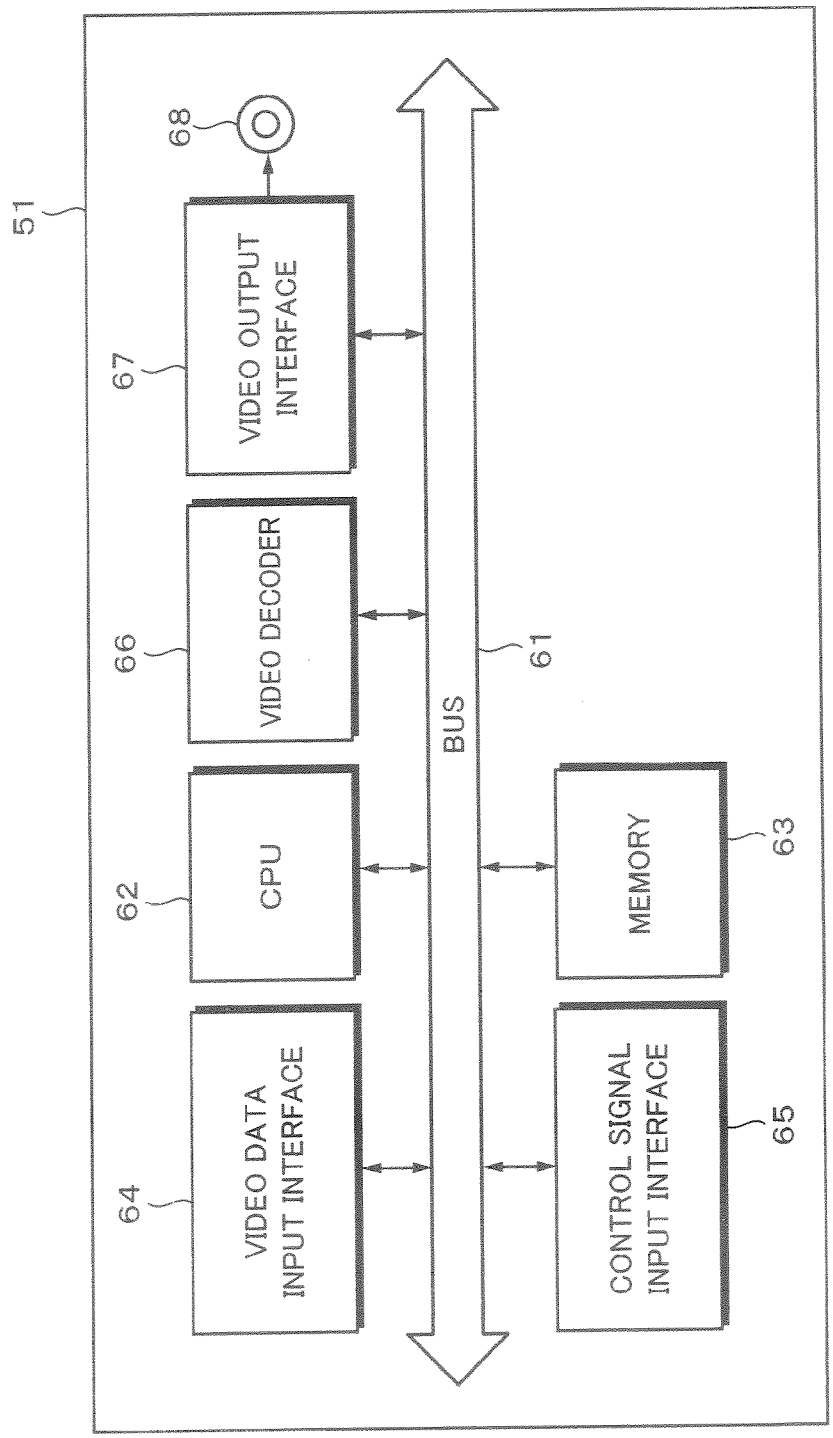
FIG. 6 is a block diagram showing an example of a structure of a decoding apparatus according to the present invention.

FIG. 6 shows an example of a structure of a decoding apparatus 51 according to the present invention.

Connected to a bus 61 are a CPU 62, a memory 63, a video data input interface 64, a control signal input interface 65, a video decoder 66, and a video output interface 67.

The CPU 62 and the memory 63 compose a computer system. In other words, the CPU 62 executes a program stored in the memory 63, controls the entire apparatus, and performs a process (that will be described later). The memory 63 stores the program that the CPU 62 executes. In addition, the memory 63 temporarily stores data with which the CPU 62 operates. The memory 63 can be structured by only a non-volatile memory or a combination of a volatile memory and a nonvolatile memory. When the apparatus is provided with a hard disk and it records (is installed with) the program that the CPU 62 executes, the memory 63 can be structured only by a volatile memory.

The program that the CPU 62 executes can be pre-stored in the memory 63 as an internal record medium of the apparatus.

Instead, the program can be temporarily or permanently stored in a removable record medium such as a disc, a flexible disc, a CD-ROM (Compact Disc Read Only Memory), an MO (Magneto Optical) disc, a magnetic disc, or a memory card. Such a removable record medium can be provided as so-called package software.

The program can be pre-stored in the memory 63 or installed from such a removable record medium to the apparatus. In addition, the program can be wirelessly transferred from a download site to the apparatus through a satellite for a digital satellite broadcast. Instead, the program can be transferred by cable from a download site to the apparatus through a network such as a LAN (Local Area Network) or the Internet. The apparatus can receive the program and install it in the internal memory 63.

The program can be processed by one CPU or distributively processed by a plurality of CPUs.

The video data input interface 64 inputs encoded data, which have been encoded by the encoding apparatus 11 and which have been supplied to the decoding apparatus 51, under the control of the CPU 62 and supplies the encoded data to the CPU 62, the memory 63, the video decoder 66, and so forth.

When the user operates a key (button) or a remote controller commander (not shown), the control signal input interface 65 inputs a control signal therefrom and supplies it to the CPU 62 through the bus 61. The control signal input interface 65 also functions as a communication interface such as a model (including an ADSL (Asymmetric Digital Subscriber Line) modem), an NIC (Network Interface Card), or the like.

The video decoder 66 decodes encoded data of video data supplied through the video data input interface 64 and the bus 61 and supplies resultant video data to the CPU 62 and the video output interface 67 through the bus 61.

The video output interface 67 performs a process necessary for the video data supplied through the bus 61 and outputs the resultant data through a video output terminal 68.

The video output terminal 68 is connected to a display device such as a CRT (Cathode Ray Tube) or a liquid crystal display panel (not shown). Thus, video data that are output from the video output terminal 68 are supplied to the display device. The display device displays the video data.

Video data can be supplied from the decoding apparatus 51 to the display device wirelessly or by cable.

Figure 8:
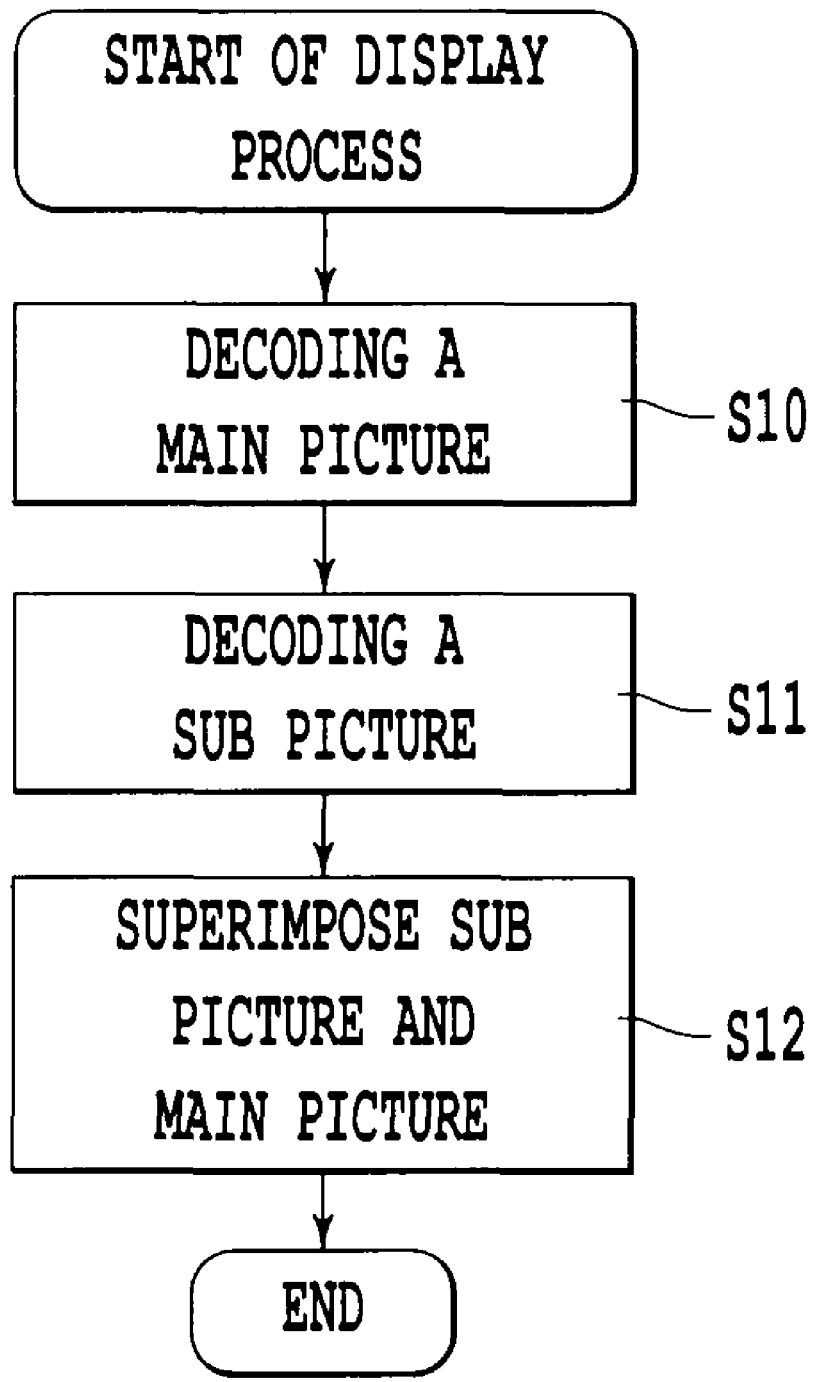
FIG. 8 is a flow chart showing an outline of an example of a process of the video decoder.

FIG. 7 shows an example of a structure of the video decoder 66 shown in FIG. 6. FIG. 8 is a flow chart showing an outline of an example of a process of the video decoder 66.

First of all, with reference to the flow chart shown in FIG. 8, an outline of an example of a display process of the video decoder 66 will be described. At step S10, a main picture decoding section 72 decodes encoded data of the main picture demultiplexed by a demultiplexing section 71. In addition, the main picture decoding section 72 extracts data of the aspect ratio and so forth of the main picture from the encoded data of the main picture. A main picture frame size converting section 74 converts the picture frame size of the main picture based on the aspect ratios of the main picture and the display device. At step S11, a sub picture decoding section 73 decodes encoded data of the sub picture demultiplexed by the demultiplexing section 71 and extracts data of the aspect ratio and so forth of the sub picture from the encoded data of the sub picture. A sub picture frame size converting section 75 converts the picture frame size of the sub picture based on the aspect ratios of the sub picture and the display device. At step S12, an adding device 76 superimposes the main picture whose picture frame size has been decided based on the aspect ratio of the display device with the sub picture. A picture of which the main picture has been superimposed with the sub picture is displayed.

The order of step S10 and step S11 is not limited to that shown in FIG. 8. For example, after the process for the sub picture at step S11 has been performed, the process for the main picture at step s10 can be performed. Instead, the process for the main picture at step S10 and the process for the sub picture at step S11 can be performed in parallel.

Next, the process of the video decoder 66 will be described in more detail. The demultiplexing section 71 demultiplexes the encoded data supplied from the video data input interface 64 into encoded data of the main picture and encoded data of the sub picture. In addition, the demultiplexing section 71 supplies the encoded data of the main picture to the main picture decoding section 72 and the encoded data of the sub picture to the sub picture decoding section 73.

The main picture decoding section 72 decodes the encoded data of the main picture and supplies the resultant decoded video data to the main picture frame size converting section 74. At this point, the main picture decoding section 72 extracts information of the aspect ratio and so forth of the main picture from the encoded data of the main picture and supplies the extracted information to the main picture frame size converting section 74.

The sub picture decoding section 73 decodes the encoded data of the sub picture and supplies the resultant decoded subtitle data to the sub picture frame size converting section 75. In addition, at this point, the sub picture decoding section 73 extracts information of the size, position, aspect ratio, and so forth of the sub picture from the encoded data of the sub picture and supplies the extracted information to the sub picture frame size converting section 75.

The main picture frame size converting section 74 converts the picture frame size of the main picture to be output based on the aspect ratio of the display device connected to the video output terminal 68 and the aspect ratio of the main picture supplied from the main picture decoding section 72 and supplies the resultant main picture to the adding device 76.

When the aspect ratio of the display device is 16:9 and that of the main picture is 4:3, the main picture frame size converting section 74 reduces the main picture in the lateral direction (horizontal direction), adds data that cause the left and right end areas of the screen to become black to the main picture, and outputs the resultant main picture.

When the aspect ratio of the display device is 4:3 and that of the main picture is 16:9, the main picture frame size converting section 74 reduces the main picture in the longitudinal direction (vertical direction), adds data that cause the upper and lower end areas of the screen to become black to the main picture, and outputs the resultant main picture.

When the aspect ratios of the display device and the main picture are the same, for example 4:3 or 16:9, the main picture frame size converting section 74 outputs the main picture without reducing it.

The sub picture frame size converting section 75 normally converts the picture frame size of the sub picture based on the aspect ratio of the sub picture supplied from the sub picture decoding section 73 and supplies the resultant sub picture to the adding device 76.

The adding device 76 superimposes the main picture supplied from the main picture frame size converting section 74 with the sub picture supplied from the sub picture frame size converting section 75 and supplies the resultant pictures to an output buffer 77.

The output buffer 77 temporarily stores data supplied from the adding device 76 and outputs the data to the video output interface 67 at a predetermined timing.

Next, with reference to a flow chart shown in FIG. 9, an operation of the sub picture frame size converting section 75 of the video decoder 66 will be described.

At step S21, the sub picture frame size converting section 75 obtains from the sub picture decoding section 73 a flag that represents the aspect ratio of the sub picture supplied to the sub picture frame size converting section 75.

At step S22, the sub picture frame size converting section 75 determines whether the aspect ratio of the display device is 4:3 (for example, 360×270) or 16:9 (for example, 480×270). When the determined result denotes that the aspect ratio is 4:3, the flow advances to step S23. At step S23, the sub picture frame size converting section 75 converts the picture frame size of 720×480 for the sub picture based on an aspect ratio of 4:3 (pixel aspect ratio=10:11) and outputs the resultant subtitle data to the adding device 76.

In other words, the sub picture is projected with an aspect ratio of 4:3 regardless of the aspect ratio of the main picture.

Figure 10:
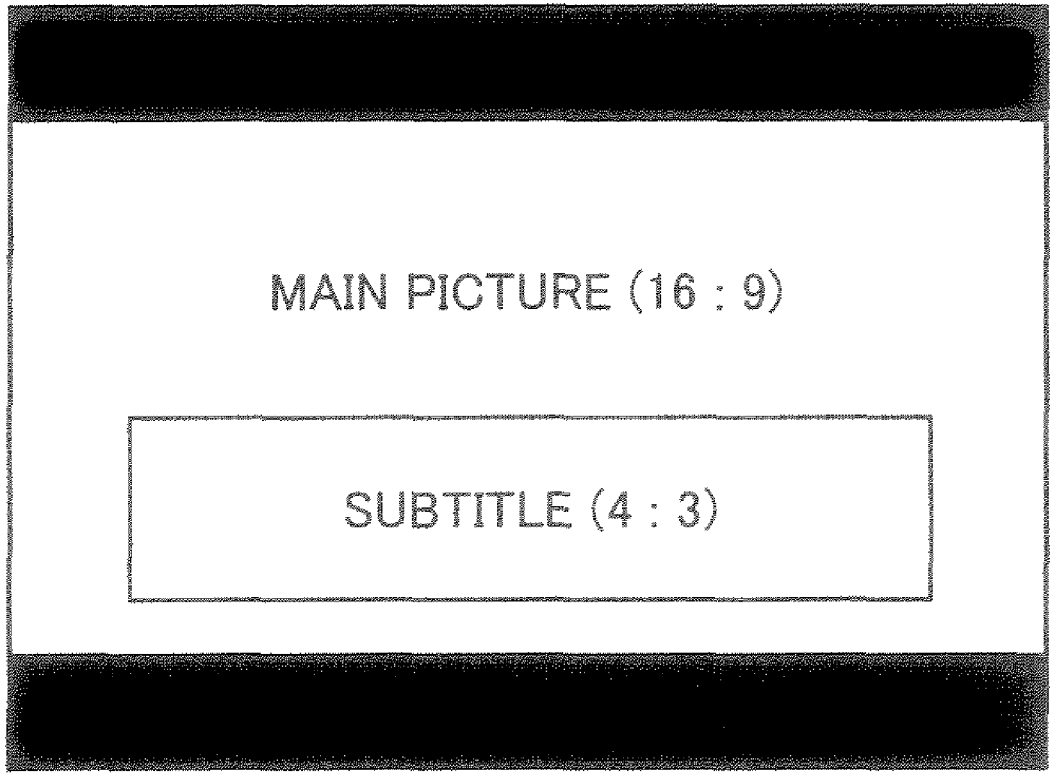
FIG. 10 is a schematic diagram showing a display example of a subtitle according to the present invention.
Figure 11:
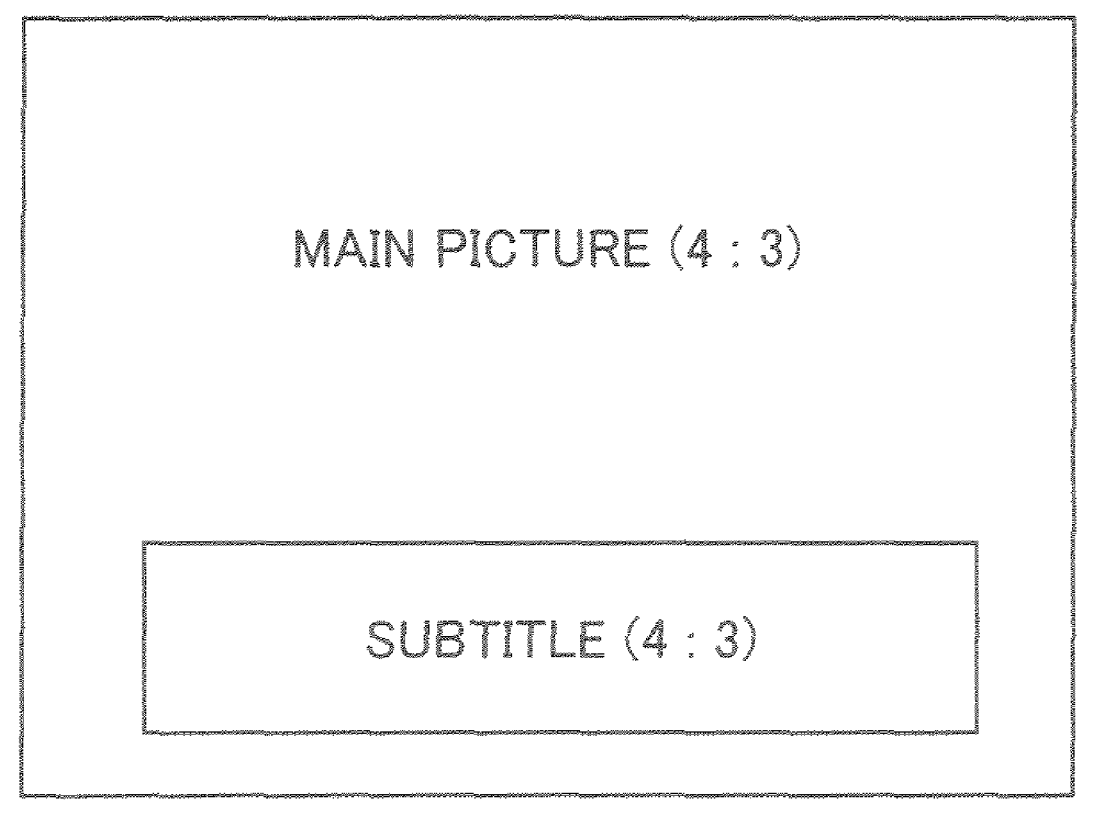

When the aspect ratio of the main picture is 16:9, as shown in FIG. 10, the picture frame size of the main picture is changed and data that cause the upper and lower end areas to become black are added. The resultant main picture is superimposed with the subtitle picture whose aspect ratio is 4:3 and the superimposed pictures are displayed. When the aspect ratio of the main picture is also 4:3, as shown in FIG. 11, the main picture is superimposed with the subtitle picture whose aspect ratio is 4:3 and the resultant superimposed pictures are displayed.

Figure 9:
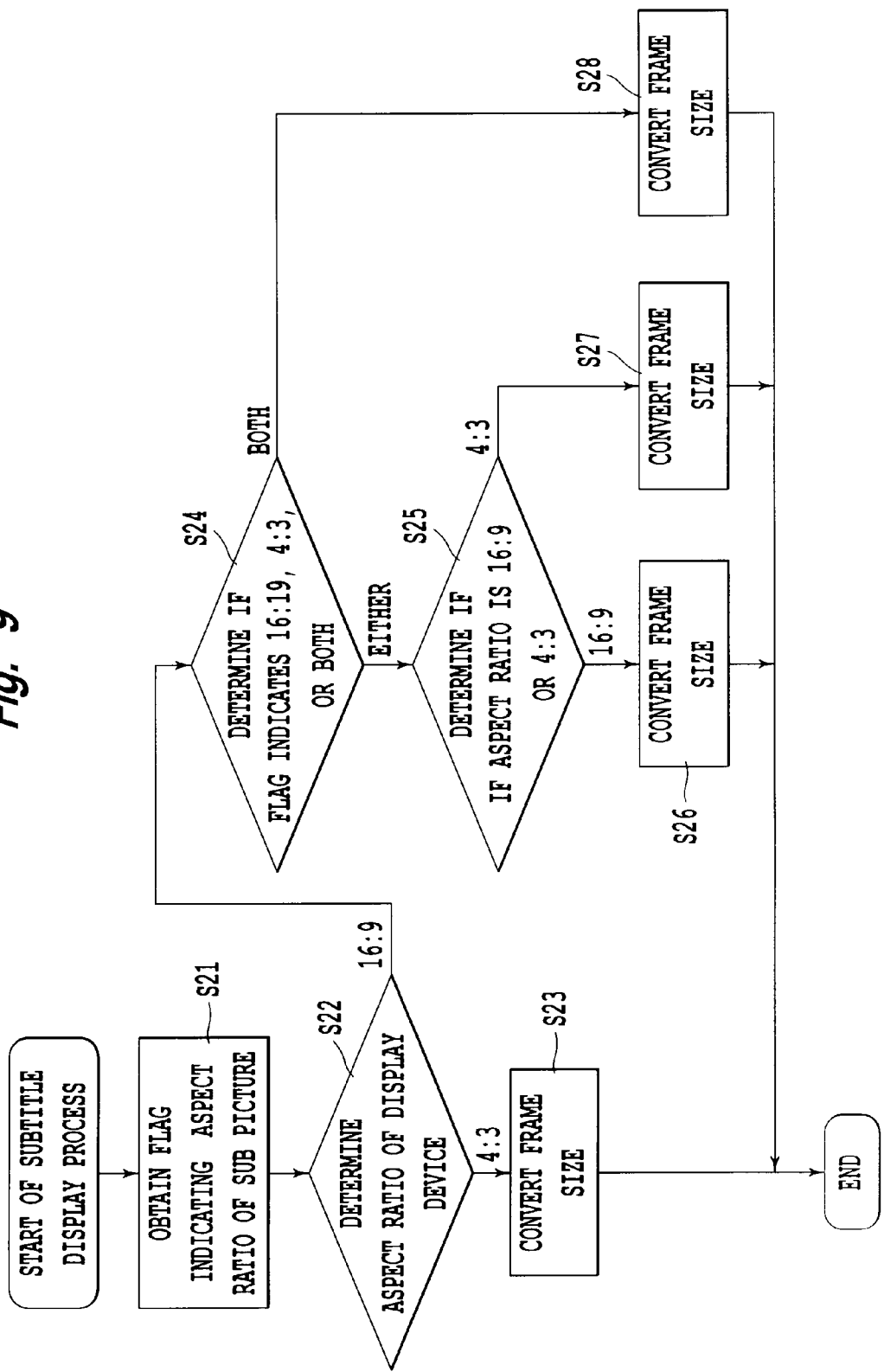
FIG. 9 is a flow chart describing an operation of a sub picture frame size converting section 75 shown in FIG. 7.
Figure 12A:
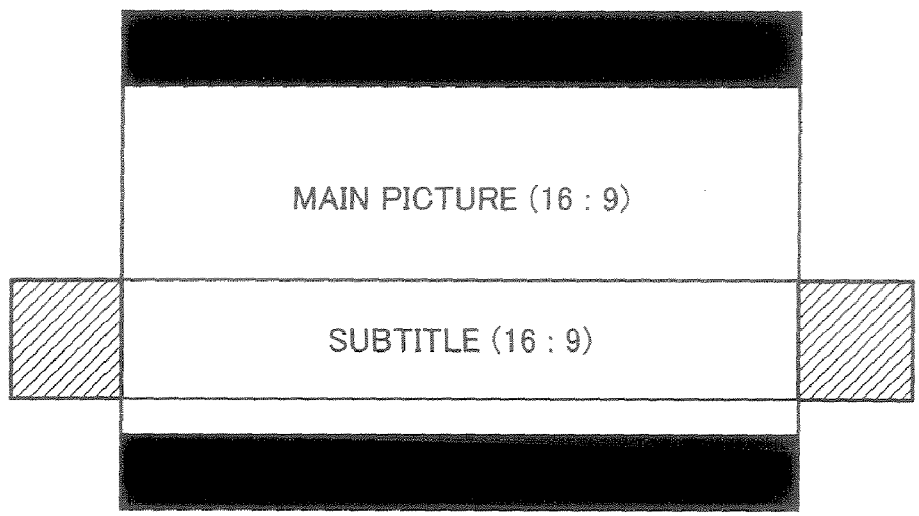
FIG. 12A and FIG. 12B are schematic diagrams describing that when the aspect ratio of the display device is 4:3, even if the aspect ratio of a main picture is 16:9, subtitle is projected with an aspect ratio of 4:3.
Figure 12B:
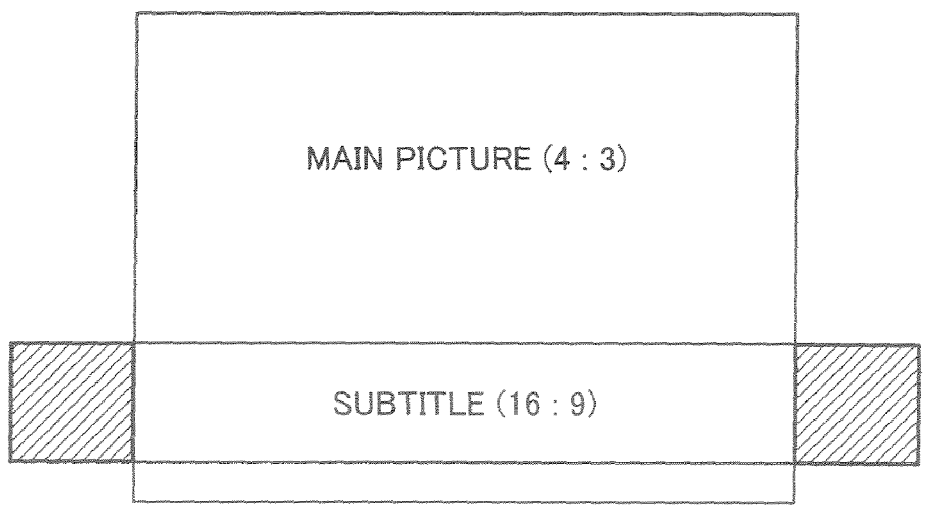

When the aspect ratio of the display device is 4:3, even if the aspect ratio of the main picture is 16:9, the subtitle picture whose aspect ratio is 4:3 is projected (at step S23 shown in FIG. 9). In other words, if the subtitle picture is projected with an aspect ratio of 16:9, as exemplified in FIG. 12A, left and right end areas of the subtitle picture are not likely to be displayed. This applies to the case that the aspect ratio of the display device is 4:3 and that of the main picture is 4:3 (see FIG. 12B). Thus, a subtitle whose aspect ratio is 16:9 is prohibited from being projected. Instead, when the aspect ratio of the display device is 4:3, that of a subtitle is 4:3.

Figure 13:
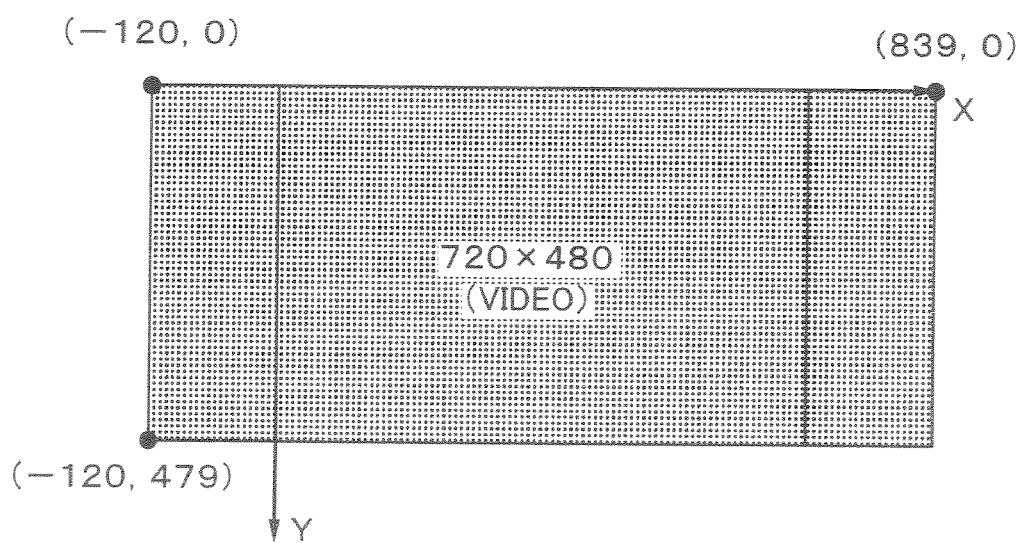
FIG. 13 is a schematic diagram showing a display area of a main picture to the coordinates of a subtitle.
Figure 14:
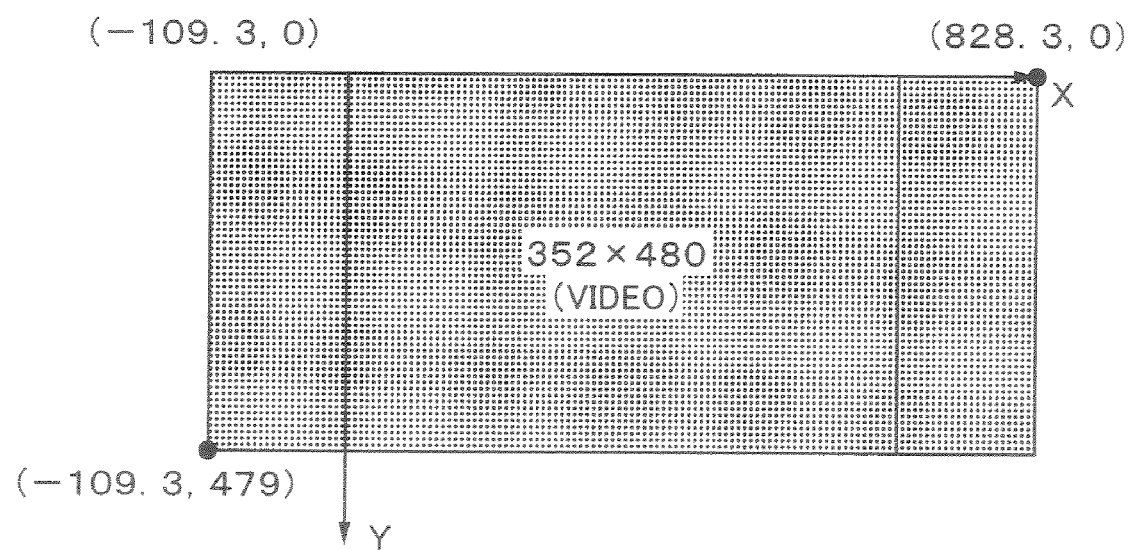
FIG. 14 is another schematic diagram showing a display area of a main picture to the coordinates of a subtitle.
Figure 15:
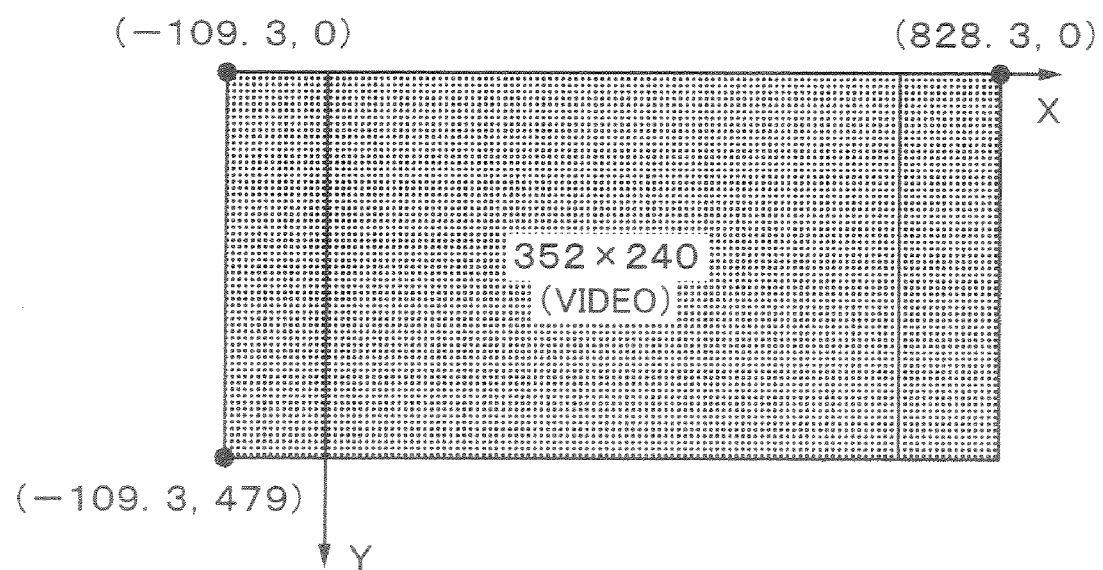
FIG. 15 is another schematic diagram showing a display area of a main picture to the coordinates of a subtitle.

When the aspect ratio of the sub picture is 4:3 and that of the main picture is 16:9 (FIG. 10), the display area of the main picture to the coordinate system of the sub picture is shaded areas shown in FIG. 13 to FIG. 15. FIG. 13 shows a display area of the main picture when its picture frame is 720×480. FIG. 14 shows a display area of the main picture when its picture frame is 352×480. FIG. 15 shows a display area of the main picture when its picture frame is 352×240.

Figure 16:
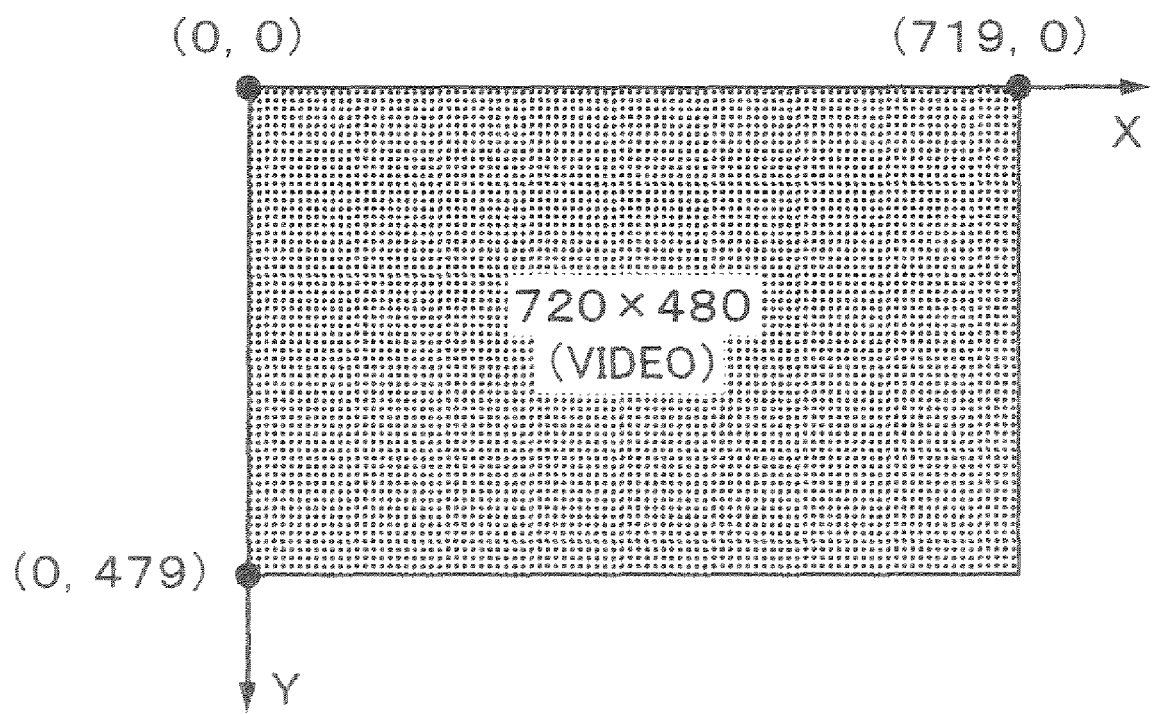
FIG. 16 is another schematic diagram showing a display area of a main picture to the coordinates of a subtitle.
Figure 17:
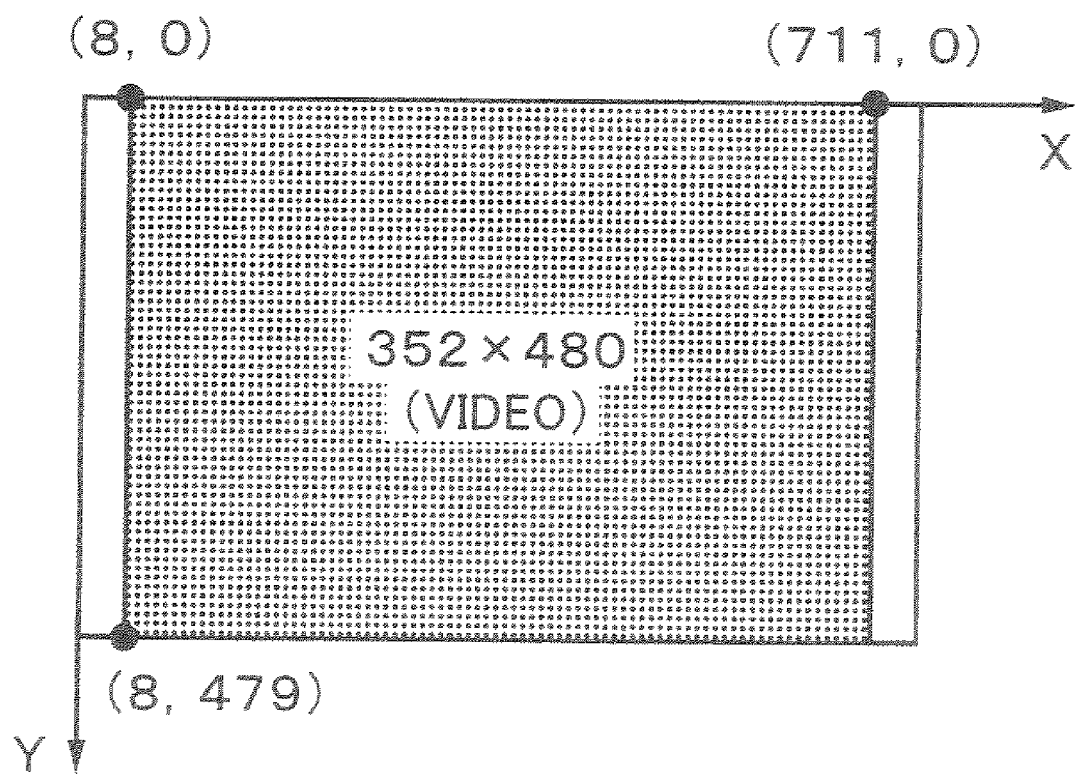
FIG. 17 is another schematic diagram showing a display area of a main picture to the coordinates of a subtitle.
Figure 18:
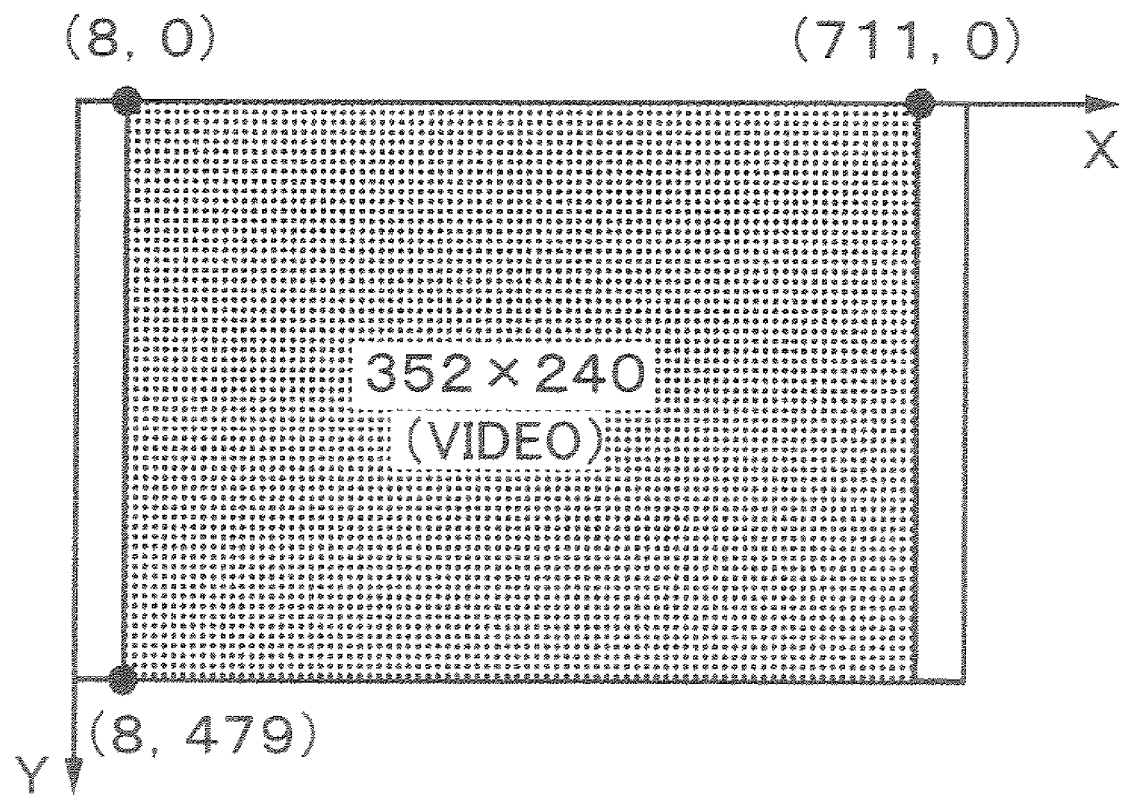
FIG. 18 is another schematic diagram showing a display area of a main picture to the coordinates of a subtitle.

When the aspect ratio of the sub picture is 4:3 and that of the main picture is also 4:3 (FIG. 11), the display area of the main picture to the coordinate system of the sub picture is shaded areas shown in FIG. 16 to FIG. 18. FIG. 16 shows a display area of the main picture when its picture frame is 720×480. FIG. 17 shows a display area of the main picture when its picture frame is 352×480. FIG. 18 shows a display area of the main picture when its picture frame is 352×240.

Returning to FIG. 9, when the determined result at step S22 denotes that the aspect ratio of the display device is 16:9, the flow advances to step S24. At step S24, the sub picture frame size converting section 75 determines whether the flag obtained at step S21 is a flag that represents both 16:9 and 4:3 as an aspect ratio of the sub picture or a flag that represents 16:9 or 4:3 as an aspect ratio of the sub picture. When the determined result denotes that the flag represents one aspect ratio, the flow advances to step S25.

At step S25, the sub picture frame size converting section 75 determines whether the flag obtained at step S21 represents 16:9 or 4:3 as an aspect ratio of the sub picture. When the determined result denotes that the flag represents 16:9 as an aspect ratio of the sub picture, the flow advances to step S26.

At step S26, the sub picture frame size converting section 75 converts the picture frame size of 720×480 for the subtitle based on an aspect ratio of 16:9 (pixel aspect ratio=40:33) and outputs the resultant subtitle data to the adding device 76.

In other words, the sub picture is displayed with an aspect ratio of 16:9 regardless of the aspect ratio of the main picture.

Figure 19:
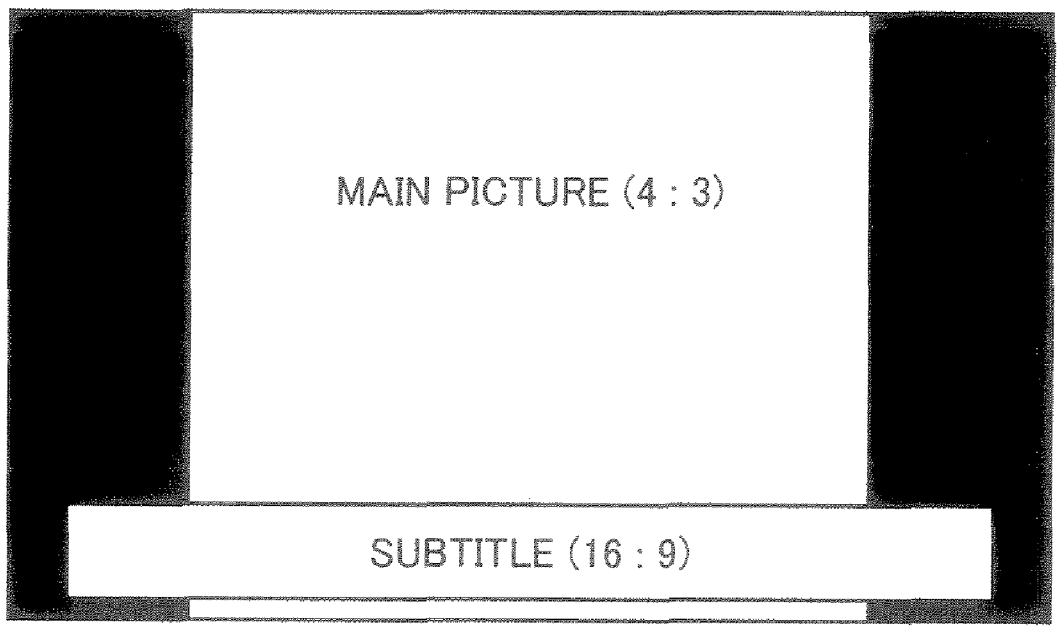
FIG. 19 is another schematic diagram showing a display example of a subtitle according to the present invention.

When the aspect ratio of the main picture is 4:3, as shown in FIG. 19, the main picture is reduced in the lateral direction and data that cause the left and right end areas to become black are added. The resultant main picture is superimposed with the subtitle picture whose aspect ratio is 16:9 and the superimposed pictures are displayed. In other words, since a subtitle can be fully displayed on the display screen of the display device, even if the display device is small and has a small display screen, the subtitle can be largely displayed.

Figure 20:
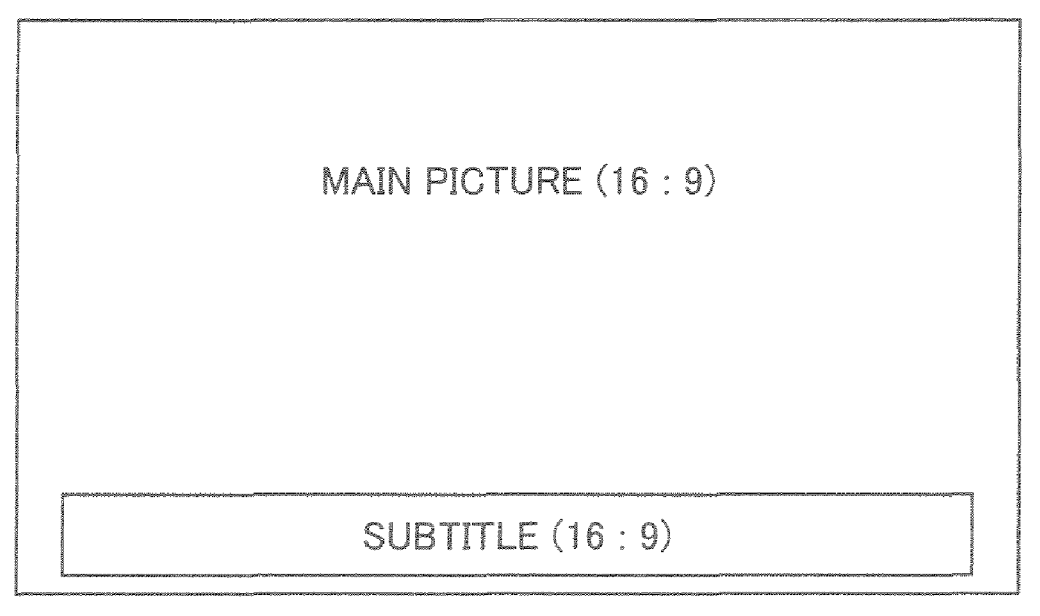

When the aspect ratio of the main picture is also 16:9, as shown in FIG. 20, the main picture is superimposed with the subtitle picture whose aspect ratio is 16:9 and the superimposed pictures are displayed.

When the aspect ratio of the sub picture is 16:9 and that of the main picture is 16:9 (FIG. 20), the display area of the main picture to the coordinate system of the sub picture is shaded areas shown in FIG. 16 to FIG. 18.

Figure 21:
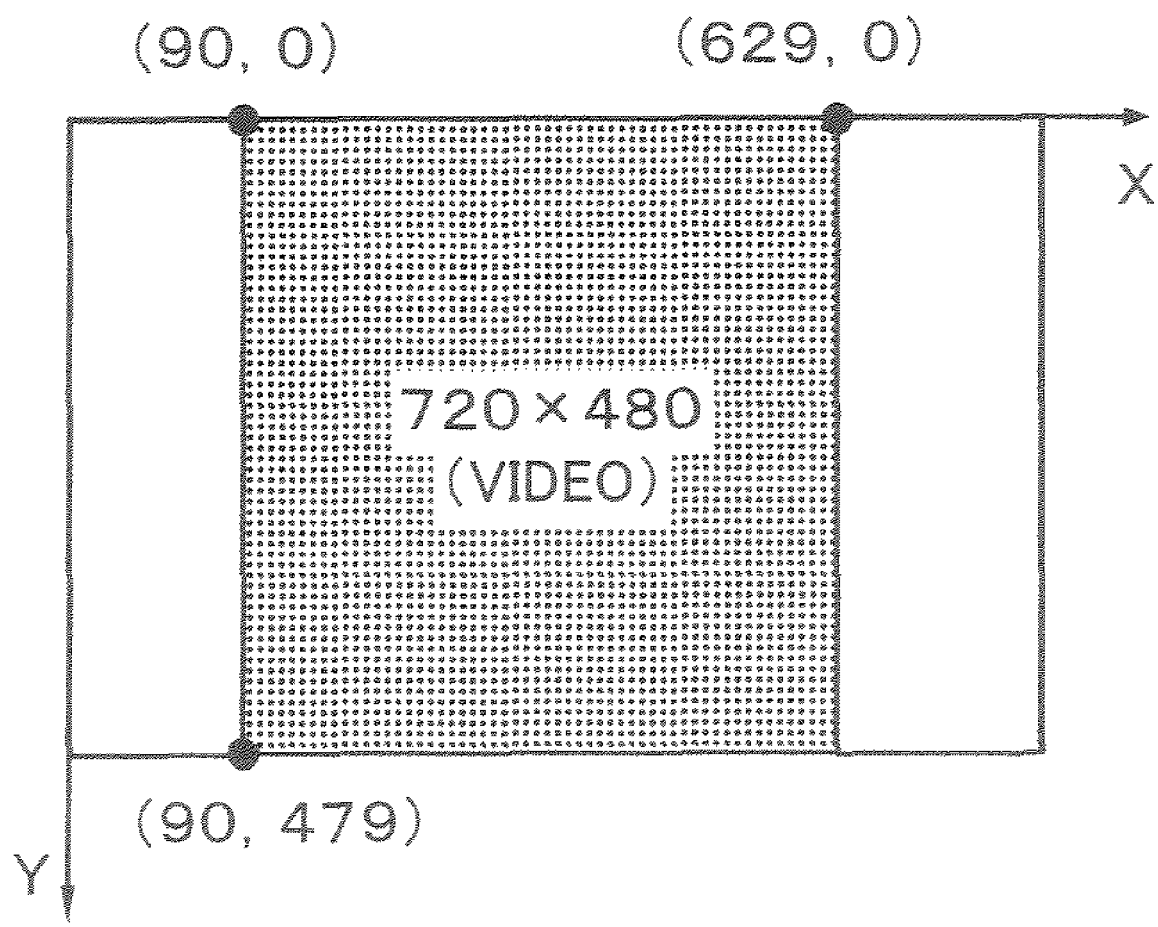
FIG. 21 is another schematic diagram showing a display area of a main picture to the coordinates of a subtitle.
Figure 22:
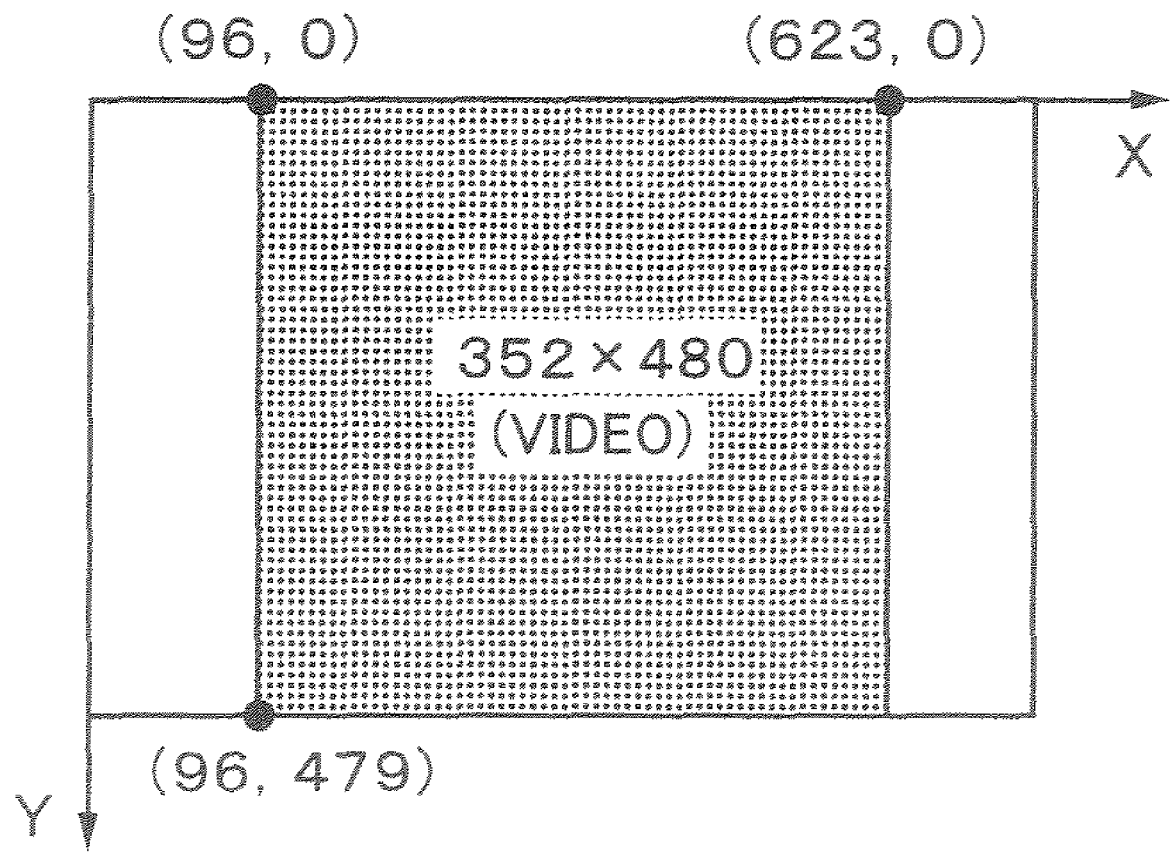
FIG. 22 is another schematic diagram showing a display area of a main picture to the coordinates of a subtitle.
Figure 23:
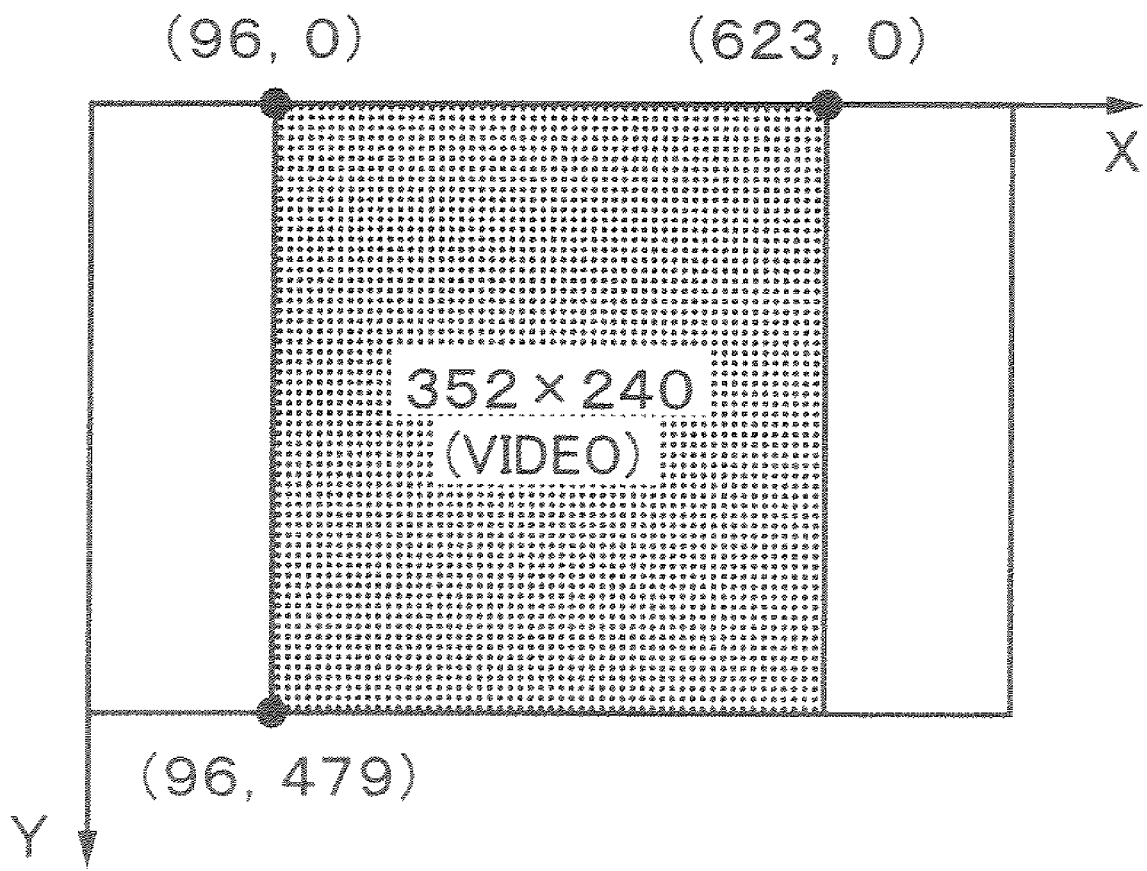
FIG. 23 is another schematic diagram showing a display area of a main picture to the coordinates of a subtitle.

When the aspect ratio of the sub picture is 16:9 and that of the main picture is 4:3 (FIG. 19), the display area of the main picture to the coordinate system of the sub picture is shaded areas shown in FIG. 21 to FIG. 23. FIG. 21 shows a display area of the main picture when its picture forme is 720×480. FIG. 22 shows a display area of the main picture when its picture frame is 352×480. FIG. 23 shows a display area of the main picture when its picture frame is 352×240.

Returning to FIG. 9, when the determined result at step S25 denotes that the aspect ratio of the sub picture is 4:3, the flow advances to step S27. At step S27, the sub picture frame size converting section 75 converts the picture frame size of 720× 480 for the subtitle based on an aspect ratio of 4:3 and outputs the resultant subtitle data to the adding device 76.

In this case, the subtitle picture is displayed (projected) with an aspect ratio of 4:3 regardless of the aspect ratio of the main picture.

Figure 24:
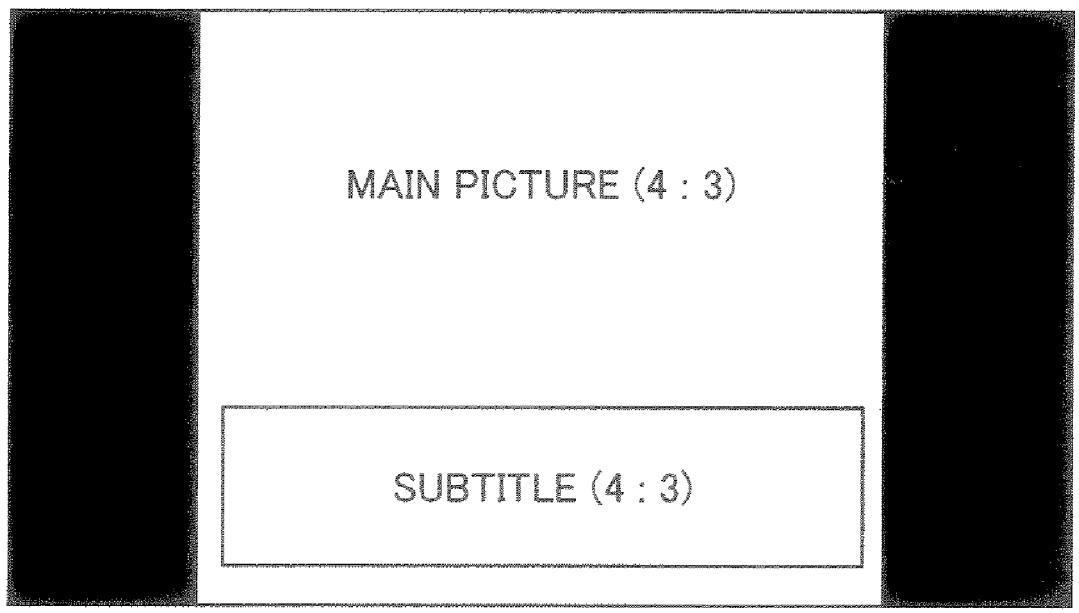
FIG. 24 is another schematic diagram showing a display example of a subtitle according to the present invention.
Figure 25:
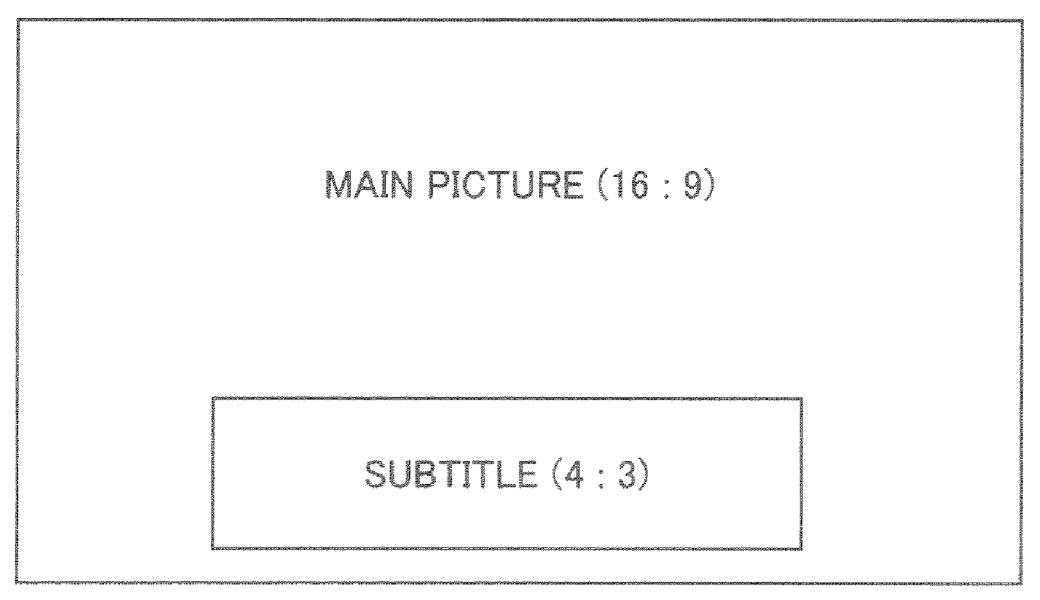

When the aspect ratio of the main picture is 4:3, as shown in FIG. 24, the main picture is reduced in the lateral direction and data that cause the left and right end areas to become black are added. The resultant main picture is superimposed with the subtitle picture whose aspect ratio is 4:3 and the superimposed pictures are displayed. When the aspect ratio of the main picture is 16:9, as shown in FIG. 25, the main picture is superimposed with the subtitle picture whose aspect ratio is 4:3 and the superimposed pictures are displayed.

When the aspect ratio of the sub picture is 4:3 and that of the main picture is also 4:3 (FIG. 24), the display area of the main picture to the coordinate system of the sub picture is areas shown in FIG. 16 to FIG. 18.

When the aspect ratio of the sub picture 4:3 and that of the main picture is 16:9 (FIG. 25), the display area of the main picture to the coordinate system of the sub picture is areas shown in FIG. 13 to FIG. 15.

When the determined result at step S24 denotes that the flag represents both 16:9 and 4:3 as an aspect ratio of the sub picture, the flow advances to step S28. In this case, since the aspect ratio of the display device is 16:9, in the same manner as step S26, the sub picture frame size converting section 75 converts the picture frame size of 720×480 for the subtitle based on an aspect ratio of 16:9 and outputs the resultant subtitle data the adding device 76.

When the subtitle is displayed at step S23, step S26, or step S28, the process is completed.

In the foregoing manner, the sub picture can be displayed based on the aspect ratio of the sub picture, which is set independently from the aspect ratio of the main picture, and that of the display device.

Although the foregoing processes can be accomplished by hardware, they can be also accomplished by software. When the processes are accomplished by software, by installing a program that composes the software to the computer and causing it to execute the program, the encoding apparatus 11 and the decoding apparatus 51 are functionally accomplished.

In this specification, steps describing a program provided by a record medium are chronologically processed in the coding order. Instead, they may be processed in parallel or discretely.

DESCRIPTION OF REFERENCE NUMERALS

11 ENCODING APPARATUS
26 VIDEO ENCODER
31 MAIN PICTURE ENCODING SECTION
32 SUB PICTURE ENCODING SECTION
33 MULTIPLEXING SECTION
51 DECODING APPARATUS
66 VIDEO DECODER
71 DEMULTIPLEXING SECTION
72 MAIN PICTURE DECODING SECTION
73 SUB PICTURE DECODING SECTION
74 MAIN PICTURE FRAME SIZE CONVERTING SECTION
75 SUB PICTURE FRAME SIZE CONVERTING SECTION
76 ADDING DEVICE
77 OUTPUT BUFFER
S1 PERFORM ENCODING PROCESS FOR MAIN PICTURE AND INCORPORATING PROCESS FOR ASPECT RATIO AND SO FORTH.
S2 PERFORM ENCODING PROCESS FOR SUB PICTURE AND INCORPORATING PROCESS FOR ASPECT RATIO AND SO FORTH.
S3 MULTIPLEX ENCODED DATA OF MAIN PICTURE IN WHICH ASPECT RATIO AND SO FORTH HAVE BEEN INCORPORATED AND ENCODED DATA OF SUB PICTURE IN WHICH ASPECT RATIO AND SO FORTH HAVE BEEN INCORPORATED,
S10 PERFORM MAIN PICTURE DISPLAY PROCESS.
S11 PERFORM SUB PICTURE DISPLAY PROCESS.
S12 SUPERIMPOSE MAIN PICTURE WHOSE SIZE HAS BEEN DECIDED BASED ON ASPECT RATIO OF DISPLAY DEVICE WITH SUB PICTURE.
S21 OBTAIN FLAG REPRESENTING ASPECT RATIO OF SUBTITLE.
S22 IS ASPECT RATIO OF DISPLAY DEVICE 16:9 OR 4:3?
S23 PROJECT SUBTITLE WITH ASPECT RATIO OF 4:3.
S24 DOES FLAG REPRESENT BOTH ASPECT RATIOS OR ONE ASPECT RATIO?
S25 IS ASPECT RATIO OF SUBTITLE 16:9 OR 4:3?
S26 PROJECT SUBTITLE WITH ASPECT RATIO OF 16:9.
S27 PROJECT SUBTITLE WITH ASPECT RATIO OF 4:3.
S28 PROJECT SUBTITLE WITH ASPECT RATIO OF 16:9.

The invention claimed is:

1. An image signal processing device, comprising:
a decoder that decodes encoded sub image data into which second aspect ratio information has been inserted, said second aspect ratio information being able to be set independently from first aspect ratio information that is inserted into main image data; and
a processor that decides an image frame size of said sub image based on third aspect ratio information and said second aspect ratio information, said third aspect ratio information being aspect ratio information of a display section that displays said main image and said sub image in a superimposing manner, wherein said processor decides the image frame size of said sub image to be said first aspect ratio, if said third aspect ratio information represents a first aspect ratio, wherein said processor decides the image frame size of said sub image to be said second aspect ratio, if said third aspect ratio information represents a second aspect ratio and if said second aspect ratio information denotes that it is capable of any one of said first aspect ratio and said second aspect ratio, wherein said processor decides the image frame size of said sub image to be said second aspect ratio, if said third aspect ratio information represents said second aspect ratio and if said second aspect ratio information represents said second aspect ratio, and wherein said processor decides the image frame size of said sub image to be said first aspect ratio, if said third aspect ratio information represents said second aspect ratio and if said second aspect ratio information represents said first aspect ratio.

2. The image signal processing device as set forth in claim 1, wherein said processor converts said decoded sub image data such that said decoded sub image data complies with said decided aspect ratio.

3. An image signal processing method, comprising:

decoding encoded sub image data into which second aspect ratio information has been inserted, said second aspect ratio information being able to be set independently from first aspect ratio information that is inserted into main image data;

deciding an image frame size of said sub image based on third aspect ratio information and said second aspect ratio information, said third aspect ratio information being aspect ratio information of a display section that displays said main image and said sub image in a superimposing manner;

deciding the image frame size of said sub image to be said first aspect ratio, if said third aspect ratio information represents a first aspect ratio;

deciding the image frame size of said sub image to be said second aspect ratio, if said third aspect ratio information represents a second aspect ratio and if said second aspect ratio information denotes that it is capable of any one of said first aspect ratio and said second aspect ratio;

deciding the image frame size of said sub image to be said second aspect ratio, if said third aspect ratio information represents said second aspect ratio and if said second aspect ratio information represents said second aspect ratio; and deciding the image frame size of said sub image to be said first aspect ratio if said third aspect ratio information represents said second aspect ratio and if said second aspect ratio information represents said first aspect ratio.

4. A non-transitory computer readable recording medium on which a program has been recorded, the program, which when executed by a processor, causes the processor to implement steps comprising:

decoding encoded sub image data into which second aspect ratio information has been inserted, said second aspect ratio information being able to be set independently from first aspect ratio information that is inserted into main image data;

deciding an image frame size of said sub image based on third aspect ratio information and said second aspect ratio information, said third aspect ratio information being aspect ratio information of a display section that displays said main image and said sub image in a superimposing manner;

deciding the image frame size of said sub image to be said first aspect ratio, if said third aspect ratio information represents a first aspect ratio;

deciding the image frame size of said sub image to be said second aspect ratio, if said third aspect ratio information represents a second aspect ratio and if said second aspect ratio information denotes that it is capable of any one of said first aspect ratio and said second aspect ratio;

deciding the image frame size of said sub image to be said second aspect ratio, if said third aspect ratio information represents said second aspect ratio and if said second aspect ratio information represents said second aspect ratio; and deciding the image frame size of said sub image to be said first aspect ratio, if said third aspect ratio information represents said second aspect ratio and if said second aspect ratio information represents said first aspect ratio.

* * * * *